(12) United States Patent
Innes et al.

(10) Patent No.: US 9,154,488 B2
(45) Date of Patent: Oct. 6, 2015

(54) SECURED ACCESS TO RESOURCES USING A PROXY

(71) Applicant: Citrix Systems, Inc., Fort Lauderdale, FL (US)

(72) Inventors: Andrew Innes, Milton (GB); Chris Mayers, Histon (GB)

(73) Assignee: Citrix Systems, Inc., Fort Lauderdale, FL (US)

(*) Notice: Subject to any disclaimer, the term of this patent is extended or adjusted under 35 U.S.C. 154(b) by 42 days.

(21) Appl. No.: 13/886,845

(22) Filed: May 3, 2013

(65) Prior Publication Data

US 2014/0331297 A1 Nov. 6, 2014

(51) Int. Cl.
H04L 29/06 (2006.01)

(52) U.S. Cl.
CPC ............ *H04L 63/08* (2013.01); *H04L 63/0281* (2013.01); *H04L 63/0884* (2013.01); *H04L 63/12* (2013.01)

(58) Field of Classification Search
CPC . H04L 63/08; H04L 63/0281; H04L 63/0815; H04L 63/0823; H04L 63/0884; H04L 63/12
USPC ............... 726/7, 8, 10, 12; 713/155, 156, 157
See application file for complete search history.

(56) References Cited

U.S. PATENT DOCUMENTS

| | | | |
|---|---|---|---|
| 2002/0143707 A1* | 10/2002 | Aull | 705/65 |
| 2003/0237004 A1* | 12/2003 | Okamura | 713/201 |
| 2005/0021526 A1* | 1/2005 | Bazot et al. | 707/100 |
| 2006/0036848 A1* | 2/2006 | Brown et al. | 713/156 |
| 2007/0174469 A1* | 7/2007 | Andress et al. | 709/227 |
| 2007/0234422 A1* | 10/2007 | Piesing | 726/19 |
| 2007/0245414 A1* | 10/2007 | Chan et al. | 726/12 |
| 2007/0283143 A1* | 12/2007 | Yami et al. | 713/156 |
| 2008/0126794 A1 | 5/2008 | Wang et al. | |
| 2008/0306922 A1* | 12/2008 | Brown et al. | 707/3 |
| 2009/0083537 A1* | 3/2009 | Larsen et al. | 713/153 |
| 2009/0092099 A1* | 4/2009 | Gu et al. | 370/331 |
| 2009/0178129 A1* | 7/2009 | Cross et al. | 726/10 |
| 2011/0202988 A1* | 8/2011 | Otranen et al. | 726/8 |
| 2011/0202989 A1* | 8/2011 | Otranen et al. | 726/8 |
| 2011/0239283 A1* | 9/2011 | Chern | 726/6 |
| 2011/0264913 A1* | 10/2011 | Nikander et al. | 713/168 |

(Continued)

OTHER PUBLICATIONS

"1.3.2 Kerberos Network Authentication Service (V5) Synopsis," msdn.microsoft.com/en-us/librarylcc233863.aspx, printed Apr. 17, 2013, pp. 1-3.

(Continued)

*Primary Examiner* — David García Cervetti
(74) *Attorney, Agent, or Firm* — Banner & Witcoff, Ltd.

(57) ABSTRACT

A method of authentication and accessing resources is provided. A client device may send a request to a proxy device to access a resource, such as an enterprise resource. The proxy device may authenticate with one or more servers associated with the resource. During authentication, the proxy device may receive a request for a signature controlled by the client device. In response, the proxy device may send a request to the client device for the signature. The request may also include context information that identify a data structure of authentication information exchanged (or to be exchanged) during the authentication session. If the client device verifies the context information, the client device may send the requested signature.

20 Claims, 11 Drawing Sheets

(56) References Cited

U.S. PATENT DOCUMENTS

| | | | |
|---|---|---|---|
| 2011/0307947 A1* | 12/2011 | Kariv et al. | 726/9 |
| 2012/0266228 A1* | 10/2012 | Dash et al. | 726/8 |
| 2012/0303661 A1* | 11/2012 | Blohm et al. | 707/776 |
| 2013/0014243 A1* | 1/2013 | Chen et al. | 726/8 |
| 2013/0046987 A1* | 2/2013 | Radhakrishnan | 713/172 |
| 2013/0047195 A1* | 2/2013 | Radhakrishnan | 726/1 |
| 2013/0047213 A1* | 2/2013 | Radhakrishnan et al. | 726/4 |
| 2013/0047214 A1* | 2/2013 | Radhakrishnan et al. | 726/4 |
| 2013/0047226 A1* | 2/2013 | Radhakrishnan et al. | 726/6 |
| 2013/0047266 A1* | 2/2013 | Radhakrishnan et al. | 726/28 |
| 2013/0091543 A1* | 4/2013 | Wade et al. | 726/1 |
| 2013/0179952 A1* | 7/2013 | O'Donnell et al. | 726/6 |
| 2013/0198519 A1* | 8/2013 | Marien | 713/172 |
| 2013/0198801 A1* | 8/2013 | Nishizawa et al. | 726/1 |
| 2013/0219461 A1* | 8/2013 | Esaki et al. | 726/1 |
| 2013/0276088 A1* | 10/2013 | Bjones et al. | 726/9 |
| 2014/0026200 A1* | 1/2014 | Ekberg et al. | 726/6 |
| 2014/0096215 A1* | 4/2014 | Hessler | 726/7 |
| 2014/0189823 A1* | 7/2014 | Mowers et al. | 726/5 |

OTHER PUBLICATIONS

Altman et al., "Channel Bindings for TLS," Jul. 2010, tools.ietf.org/html/rfc5929, © 2010 IETF Trust, printed Apr. 17, 2013, pp. 1-30.

ASN.1, Reference Card format USA, printed Apr. 17, 2013, pp. 1-2, available at www.oss.com/asn1/resources/reference/ASN.1-Reference-Card-format-USA.pdf.

BitzerMobile-Simplifying Enterprise Mobility; "Secure enterprise workspace on your mobile device," blitzermobile.com, printed Apr. 17, 2013, pp. 1-2.

Dierks and Rescorla, "The Transport Layer Security (TLS) Protocol Version 1.1," Apr. 2006, tools.ietf.org/rfc/rfc4346.txt, © The Internet Society 2006, pp. 1-86.

Dierks and Rescorla, "The Transport Layer Security (TLS) Protocol Version 1.2," Aug. 2008, tools.ietf.org/html/rfc5246, printed Apr. 17, 2013, pp. 1-208.

Dubuisson, "ASN.1: A Powerful Schema Notation for XML and Fast Web Services," ITU, http://www.itu.int/itu-t/asnl/xml/ASN1-XML-FastWebServices.pdf, Apr. 2004, pp. 1-33.

"Extended Protection for Authentication Overview," msdn. microsoft.com/en-us/library/vstudio/dd767318%28v=vs.90%29. aspx, printed Apr. 17, 2013, pp. 1-3.

Franks et al., "HTTP Authentication: Basic and Digest Access Authentication," Jun. 1999, www.ietf.org/rfc/rfc2617.txt, © The Internet Society 1999, pp. 1-34.

Gemalto: security to be free; www.gemalto.com; printed May 9, 2013; pp. 1-10.

Hartman and Zhu, "A Generalized Framework for Kerberos Pre-Authentication," Apr. 2011, Request for Comments: 6113, © 2011, pp. 1-49.

Housley, "Cryptographic Message Syntax (CMS)," Jul. 2004, www.ietf.org/rfc/rfc3852.txt, © The Internet Society 2004, pp. 1-56.

Jaganathan et al., "SPNEGO-based Kerberos and NTLM HTTP Authentication in Microsoft Windows," Jun. 2006, www.iettorg/rfc/rfc4559.txt, © The Internet Society 2006, pp. 1-8.

"KERB_CERTIFICATE_LOGON structure," msdn.microsoft.com/en-us/library/bb545680%28v=vs.85%29.aspx, printed Apr. 17, 2013, pp. 1-4.

"Kerberos and SPNEGO," The kSpace, Sep. 23, 2010, thekspace.com/home/component/content/article/54-kerberos-and-spnego.html, printed Apr. 18, 2013, pp. 1-3.

Kerberos: The Network Authentication Protocol; "What is Kerberos," web.mit.edu/Kerberos/, printed Apr. 29, 2013; pp. 1-3.

Kerberos SSP/AP (Windows), msdn.microsoft.com/en-us/library/windows/desktop/aa377942%28v=vs.85%29.aspx, © 2013 Microsoft, printed Apr. 17, 2013, p. 1.

"Kerberos V5 System Administrator's Guide," web.mit.edu/Kerberos/krb5-1.9/krb5-1.9.1/doc/krb5-admin.html#pkinit-client-options, printed Apr. 17, 2013, pp. 1-63.

"LsaCallAuthenticationPackage function," msdn.microsoft.com/en-us/library/aa378261(v=vs.85).aspx, printed Apr. 17, 2013, pp. 1-4.

McPherson, "The Windows Negotiation Extension and Writing NegoEx SSPs," Microsoft Corporation, msdn.microsoft.com/en-us/library/ff468736.aspx, printed Apr. 17, 2013, pp. 1-23.

"Microsoft NTLM," msdn.microsoft.com/en-us/library/window/desktop/aa378749(v=vs.85).aspx, printed Apr. 18, 2013, pp. 1-3.

[MS-KKDCP]: Kerberos Key Distribution Center (KDC) Proxy Protocol, msdn.microsoft.com/en-us/library/hh553774%28v=prot.20%29.aspx, printed Apr. 17, 2013, pp. 1-3.

Neuman et al., "The Kerberos Network Authentication Service (V5)," Jul. 2005, www.ietf.org/rfc/rfc4120.txt, © The Internet Society 2005, pp. 1-136.

RSA Laboratories, "PKCS #11: Cryptographic Token Interface Standard," www.rsa.com/rsalabs/node.asp?id=2133, printed Apr. 18, 2013, pp. 1-4.

RSA Laboratories, "Public-Key Cryptography Standards (PKCS)," www.rsa.com/rsalabs/node.asp?id=2124, printed Apr. 18, 2013, pp. 1-2.

"Security Requirements for Cryptographic Modules," FIPS PUB 140-2, Information Technology Laboratory, National Institute of Standards and Technology, Issued May 25, 2001, pp. 1-69.

"Strong Authentication with One-Time Passwords in Windows 7 and Windows Server 2008 R2," Published Feb. 7, 2011, Updated Jan. 14, 2012, technet.microsoft.com/en-us/library/gg637807%028v=WS.10%29.aspx, printed Apr. 17, 2013, pp. 1-17.

Zhu and Tung, "Public Key Cryptography for Initial Authentication in Kerberos (PKINIT)," Jun. 2006, tools.ietf.org/html/rfc4556, © The Internet Society 2006, pp. 1-84.

International Search Report and Written Opinion off corresponding International Application No. PCT/US2014/036312, mailed Sep. 5, 2014.

* cited by examiner

SECURED ACCESS TO RESOURCES USING A PROXY

FIELD

Aspects described herein generally relate to providing approaches for a client device to securely access resources using a proxy device.

BACKGROUND

Traditionally, client devices connected to public networks connect to private networks using virtual private networks (VPNs). In a VPN, a proxy device, simply acting as a transparent pipe, may provide the necessary connection between the client device and the private network. Various problems with traditional VPNs exist. First, a lot of trust is put on the client device because the client device can directly access resources on the private networks. Second, the client device must be configured for the communication protocol of the resource and/or private network. Third, the proxy device cannot control or monitor the activities of the client device.

SUMMARY

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below.

To overcome limitations in the prior art described above, and to overcome other limitations that will be apparent upon reading and understanding the present specification, aspects described herein are directed towards a system, an apparatus, and/or computer readable media configured to perform a method comprising receiving, at a proxy device and from a client device, a request for a resource and sending, from the proxy device to a resource management device, a request for the resource. An authentication session between the proxy device and the resource management device may be initiated. The proxy device may generate a request for the client device to provide a signature, wherein the request for the client device to provide the signature may comprise context information identifying a data structure of at least one of (1) authentication information previously exchanged between the proxy device and the resource management device and (2) authentication information to be sent by the proxy device to the resource management device. The proxy device may receive the signature from the client device, such as if the client device has verified the context information. The signature may be provided from a smart card at the client device. The proxy device may send the signature to the resource management device.

In some embodiments, the method may further comprise, after initiating the authentication session, receiving, at the proxy device and from the client device, a list of security certificates available to the client device. A security certificate for the authentication session may be selected. Furthermore, the request for the client device to provide the signature may include an identification of the selected security certificate.

The method may further comprise, after sending the signature to the resource management device, receiving, at the proxy device, a session key corresponding to the signature. The proxy device may use the session key to obtain the requested resource from the resource management device. The proxy device may send the requested resource to the client device.

In some aspects, the authentication session may comprise SSL authentication, and the context information identifying the data structure may comprise SSL authentication messages previously exchanged between the proxy device and the resource management device during the authentication session. In other aspects, the authentication session may comprise Kerberos authentication, and the context information identifying the data structure may comprise information identifying a Kerberos data structure. For example, the Kerberos data structure may comprise Abstract Syntax Notation 1. Additionally or alternatively, the context information identifying the data structure may comprise at least one of a Kerberos domain used for the Kerberos authentication, a Kerberos principal name associated with the client device, an identifier of a key distribution center used for the authentication session, a validity period of a requested ticket, and Kerberos flags that have been set during the authentication session.

In some embodiments, the context information may identify a timestamp associated with the authentication session. Additionally or alternatively, the context information may identify a protocol type of the authentication session. In some aspects, a proxy device comprising a processor and memory storing computer-executable instructions that, when executed by the processor, may cause the proxy device to perform the previously-described method steps.

A system, an apparatus, and/or computer readable media may be configured to perform a method comprising sending, from a client device to a proxy device, a request for a resource. The client device may receive, from the proxy device, a request for the client device to provide a signature. The request for the client device to provide the signature may comprise context information identifying a data structure of at least one of (1) authentication information previously exchanged between the proxy device and a resource management device associated with the requested resource and (2) authentication information to be sent by the proxy device to the resource management device. The client device may verify the data structure, and in response to verifying the data structure, the client device may send, to the proxy device, a signature corresponding to a security certificate. The security certificate may be stored on a smart card connected to the client device. The method may further comprise in response to a request, sending, from the client device to the proxy device, a list comprising one or more security certificates available to the client device. The received request for the client device to provide the signature may include an identification of a security certificate selected from the list comprising one or more security certificates.

These and additional aspects will be appreciated with the benefit of the disclosures discussed in further detail below.

BRIEF DESCRIPTION OF THE DRAWINGS

A more complete understanding of aspects described herein and the advantages thereof may be acquired by referring to the following description in consideration of the accompanying drawings, in which like reference numbers indicate like features, and wherein.

DETAILED DESCRIPTION

In the following description of the various embodiments, reference is made to the accompanying drawings identified above and which form a part hereof, and in which is shown by way of illustration various embodiments in which aspects described herein may be practiced. It is to be understood that other embodiments may be utilized and structural and functional modifications may be made without departing from the scope described herein. Various aspects are capable of other embodiments and of being practiced or being carried out in various different ways.

As a general introduction to the subject matter described in more detail below, aspects described herein are directed towards controlling remote access to resources at an enterprise computing system using managed mobile applications at mobile computing devices. An access manager may perform a validation process that determines whether a mobile application requesting access to enterprise resources has accurately identified itself and has not been subsequently altered after installation at the mobile computing device. In this way, the access manager may ensure the mobile application requesting access to the enterprise resource can be trusted and is not attempting to circumvent the security mechanisms used to protect those enterprise resources. As a result, individuals associated with the enterprise may advantageously utilize enterprise resources at their personal mobile devices.

It is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof. The use of the terms "mounted," "connected," "coupled," "positioned," "engaged" and similar terms, is meant to include both direct and indirect mounting, connecting, coupling, positioning and engaging.

Computing Architecture

Figure 1:
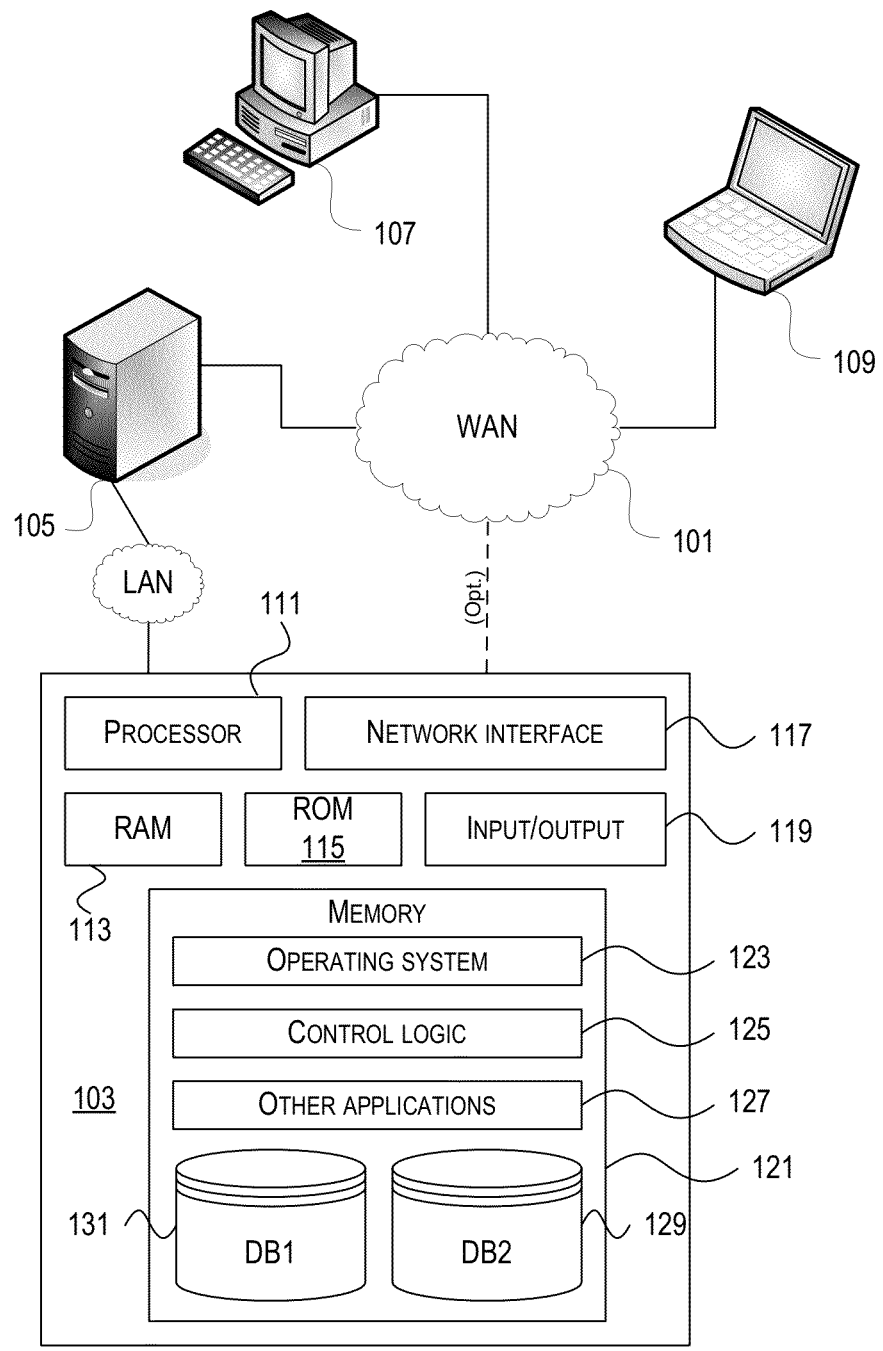
FIG. 1 depicts an illustrative computer system architecture that may be used in accordance with one or more illustrative aspects described herein.

Computer software, hardware, and networks may be utilized in a variety of different system environments, including standalone, networked, remote-access (aka, remote desktop), virtualized, and/or cloud-based environments, among others. FIG. 1 illustrates one example of a system architecture and data processing device that may be used to implement one or more illustrative aspects described herein in a standalone and/or networked environment. Various network nodes 103, 105, 107, and 109 may be interconnected via a wide area network (WAN) 101, such as the Internet. Other networks may also or alternatively be used, including private intranets, corporate networks, LANs, metropolitan area networks (MAN) wireless networks, personal networks (PAN), and the like. Network 101 is for illustration purposes and may be replaced with fewer or additional computer networks. A local area network (LAN) may have one or more of any known LAN topology and may use one or more of a variety of different protocols, such as Ethernet. Devices 103, 105, 107, 109 and other devices (not shown) may be connected to one or more of the networks via twisted pair wires, coaxial cable, fiber optics, radio waves or other communication media.

The term "network" as used herein and depicted in the drawings refers not only to systems in which remote storage devices are coupled together via one or more communication paths, but also to stand-alone devices that may be coupled, from time to time, to such systems that have storage capability. Consequently, the term "network" includes not only a "physical network" but also a "content network," which is comprised of the data—attributable to a single entity—which resides across all physical networks.

The components may include data server 103, web server 105, and client computers 107, 109. Data server 103 provides overall access, control and administration of databases and control software for performing one or more illustrative aspects describe herein. Data server 103 may be connected to web server 105 through which users interact with and obtain data as requested. Alternatively, data server 103 may act as a web server itself and be directly connected to the Internet. Data server 103 may be connected to web server 105 through the network 101 (e.g., the Internet), via direct or indirect connection, or via some other network. Users may interact with the data server 103 using remote computers 107, 109, e.g., using a web browser to connect to the data server 103 via one or more externally exposed web sites hosted by web server 105. Client computers 107, 109 may be used in concert with data server 103 to access data stored therein, or may be used for other purposes. For example, from client device 107 a user may access web server 105 using an Internet browser, as is known in the art, or by executing a software application that communicates with web server 105 and/or data server 103 over a computer network (such as the Internet).

Servers and applications may be combined on the same physical machines, and retain separate virtual or logical addresses, or may reside on separate physical machines. FIG. 1 illustrates just one example of a network architecture that may be used, and those of skill in the art will appreciate that the specific network architecture and data processing devices used may vary, and are secondary to the functionality that they provide, as further described herein. For example, services provided by web server 105 and data server 103 may be combined on a single server.

Each component 103, 105, 107, 109 may be any type of known computer, server, or data processing device. Data server 103, e.g., may include a processor 111 controlling overall operation of the rate server 103. Data server 103 may further include RAM 113, ROM 115, network interface 117, input/output interfaces 119 (e.g., keyboard, mouse, display, printer, etc.), and memory 121. I/O 119 may include a variety of interface units and drives for reading, writing, displaying, and/or printing data or files. Memory 121 may further store operating system software 123 for controlling overall operation of the data processing device 103, control logic 125 for instructing data server 103 to perform aspects described herein, and other application software 127 providing secondary, support, and/or other functionality which may or may not be used in conjunction with aspects described herein. The control logic may also be referred to herein as the data server software 125. Functionality of the data server software may refer to operations or decisions made automatically based on rules coded into the control logic, made manually by a user providing input into the system, and/or a combination of automatic processing based on user input (e.g., queries, data updates, etc.).

Memory 121 may also store data used in performance of one or more aspects described herein, including a first database 129 and a second database 131. In some embodiments, the first database may include the second database (e.g., as a separate table, report, etc.). That is, the information can be stored in a single database, or separated into different logical, virtual, or physical databases, depending on system design. Devices 105, 107, 109 may have similar or different architecture as described with respect to device 103. Those of skill in the art will appreciate that the functionality of data processing device 103 (or device 105, 107, 109) as described herein may be spread across multiple data processing devices, for example, to distribute processing load across multiple computers, to segregate transactions based on geographic location, user access level, quality of service (QoS), etc.

One or more aspects may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HTML or XML. The computer executable instructions may be stored on a computer readable medium such as a nonvolatile storage device. Any suitable computer readable storage media may be utilized, including hard disks, CD-ROMs, optical storage devices, magnetic storage devices, and/or any combination thereof. In addition, various transmission (non-storage) media representing data or events as described herein may be transferred between a source and a destination in the form of electromagnetic waves traveling through signal-conducting media such as metal wires, optical fibers, and/or wireless transmission media (e.g., air and/or space). Various aspects described herein may be embodied as a method, a data processing system, or a computer program product. Therefore, various functionalities may be embodied in whole or in part in software, firmware and/or hardware or hardware equivalents such as integrated circuits, field programmable gate arrays (FPGA), and the like. Particular data structures may be used to more effectively implement one or more aspects described herein, and such data structures are contemplated within the scope of computer executable instructions and computer-usable data described herein.

Figure 2:
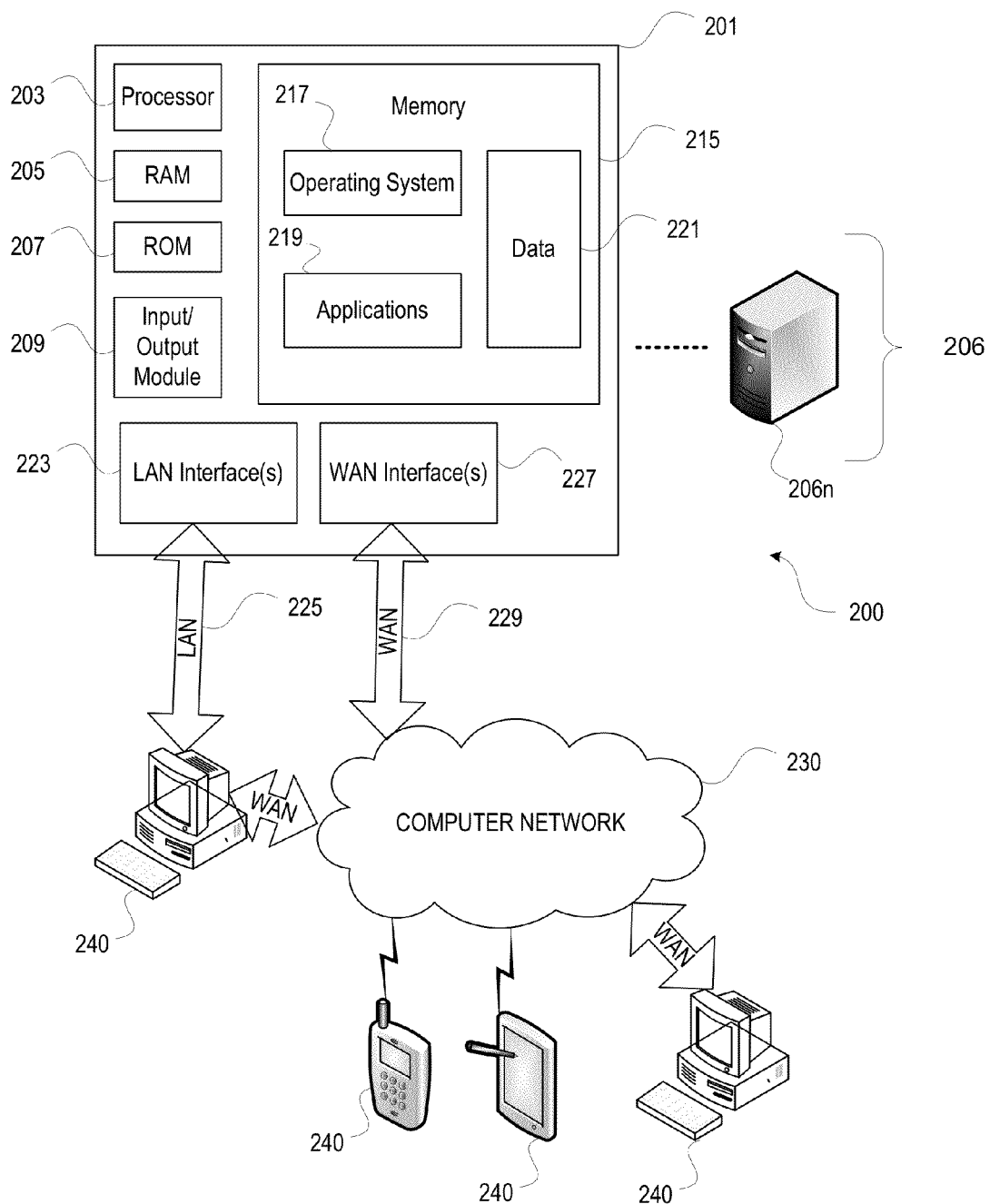
FIG. 2 depicts an illustrative remote-access system architecture that may be used in accordance with one or more illustrative aspects described herein.

With further reference to FIG. 2, one or more aspects described herein may be implemented in a remote-access environment. FIG. 2 depicts an example system architecture including a generic computing device 201 in an illustrative computing environment 200 that may be used according to one or more illustrative aspects described herein. Generic computing device 201 may be used as a server 206a in a single-server or multi-server desktop virtualization system (e.g., a remote access or cloud system) configured to provide virtual machines for client access devices. The generic computing device 201 may have a processor 203 for controlling overall operation of the server and its associated components, including random access memory (RAM) 205, read-only memory (ROM) 207, input/output (I/O) module 209, and memory 215.

I/O module 209 may include a mouse, keypad, touch screen, scanner, optical reader, and/or stylus (or other input device(s)) through which a user of generic computing device 201 may provide input, and may also include one or more of a speaker for providing audio output and a video display device for providing textual, audiovisual, and/or graphical output. Software may be stored within memory 215 and/or other storage to provide instructions to processor 203 for configuring generic computing device 201 into a special purpose computing device in order to perform various functions as described herein. For example, memory 215 may store software used by the computing device 201, such as an operating system 217, application programs 219, and an associated database 221.

Computing device 201 may operate in a networked environment supporting connections to one or more remote computers, such as terminals 240 (also referred to as client devices). The terminals 240 may be personal computers, mobile devices, laptop computers, tablets, or servers that include many or all of the elements described above with respect to the generic computing device 103 or 201. The network connections depicted in FIG. 2 include a local area network (LAN) 225 and a wide area network (WAN) 229, but may also include other networks. When used in a LAN networking environment, computing device 201 may be connected to the LAN 225 through a network interface or adapter 223. When used in a WAN networking environment, computing device 201 may include a modem 227 or other wide area network interface for establishing communications over the WAN 229, such as computer network 230 (e.g., the Internet). It will be appreciated that the network connections shown are illustrative and other means of establishing a communications link between the computers may be used. Computing device 201 and/or terminals 240 may also be mobile terminals (e.g., mobile phones, smartphones, PDAs, notebooks, etc.) including various other components, such as a battery, speaker, and antennas (not shown).

Aspects described herein may also be operational with numerous other general purpose or special purpose computing system environments or configurations. Examples of other computing systems, environments, and/or configurations that may be suitable for use with aspects described herein include, but are not limited to, personal computers, server computers, hand-held or laptop devices, multiprocessor systems, microprocessor-based systems, set top boxes, programmable consumer electronics, network PCs, mini-computers, mainframe computers, distributed computing environments that include any of the above systems or devices, and the like.

As shown in FIG. 2, one or more client devices 240 may be in communication with one or more servers 206a-206n (generally referred to herein as "server(s) 206"). In one embodiment, the computing environment 200 may include a network appliance installed between the server(s) 206 and client machine(s) 240. The network appliance may manage client/server connections, and in some cases can load balance client connections amongst a plurality of backend servers 206.

The client machine(s) 240 may in some embodiments be referred to as a single client machine 240 or a single group of client machines 240, while server(s) 206 may be referred to as a single server 206 or a single group of servers 206. In one embodiment a single client machine 240 communicates with more than one server 206, while in another embodiment a single server 206 communicates with more than one client machine 240. In yet another embodiment, a single client machine 240 communicates with a single server 206.

A client machine 240 can, in some embodiments, be referenced by any one of the following non-exhaustive terms: client machine(s); client(s); client computer(s); client device(s); client computing device(s); local machine; remote machine; client node(s); endpoint(s); or endpoint node(s). The server 206, in some embodiments, may be referenced by any one of the following non-exhaustive terms: server(s), local machine; remote machine; server farm(s), or host computing device(s).

In one embodiment, the client machine 240 may be a virtual machine. The virtual machine may be any virtual machine, while in some embodiments the virtual machine may be any virtual machine managed by a Type 1 or Type 2 hypervisor, for example, a hypervisor developed by Citrix Systems, IBM, VMware, or any other hypervisor. In some aspects, the virtual machine may be managed by a hypervisor, while in aspects the virtual machine may be managed by a hypervisor executing on a server 206 or a hypervisor executing on a client 240.

Some embodiments include a client device 240 that displays application output generated by an application remotely executing on a server 206 or other remotely located machine. In these embodiments, the client device 240 may execute a virtual machine client agent program or application to display the output in an application window, a browser, or other output window. In one example, the application is a desktop, while in other examples the application is an application that generates or presents a desktop. A desktop may include a graphical shell providing a user interface for an instance of an operating system in which local and/or remote applications can be integrated. Applications, as used herein, are programs that execute after an instance of an operating system (and, optionally, also the desktop) has been loaded.

The server 206, in some embodiments, uses a remote presentation protocol or other program to send data to a thin-client or remote-display application executing on the client to present display output generated by an application executing on the server 206. The thin-client or remote-display protocol can be any one of the following non-exhaustive list of protocols: the Independent Computing Architecture (ICA) protocol developed by Citrix Systems, Inc. of Ft. Lauderdale, Fla.; or the Remote Desktop Protocol (RDP) manufactured by the Microsoft Corporation of Redmond, Wash.

A remote computing environment may include more than one server 206a-206n such that the servers 206a-206n are logically grouped together into a server farm 206, for example, in a cloud computing environment. The server farm 206 may include servers 206 that are geographically dispersed while and logically grouped together, or servers 206 that are located proximate to each other while logically grouped together. Geographically dispersed servers 206a-206n within a server farm 206 can, in some embodiments, communicate using a WAN (wide), MAN (metropolitan), or LAN (local), where different geographic regions can be characterized as: different continents; different regions of a continent; different countries; different states; different cities; different campuses; different rooms; or any combination of the preceding geographical locations. In some embodiments the server farm 206 may be administered as a single entity, while in other embodiments the server farm 206 can include multiple server farms.

In some embodiments, a server farm may include servers 206 that execute a substantially similar type of operating system platform (e.g., WINDOWS, UNIX, LINUX, iOS, ANDROID, SYMBIAN, etc.) In other embodiments, server farm 206 may include a first group of one or more servers that execute a first type of operating system platform, and a second group of one or more servers that execute a second type of operating system platform.

Server 206 may be configured as any type of server, as needed, e.g., a file server, an application server, a web server, a proxy server, an appliance, a network appliance, a gateway, an application gateway, a gateway server, a virtualization server, a deployment server, a SSL VPN server, a firewall, a web server, an application server or as a master application server, a server executing an active directory, or a server executing an application acceleration program that provides firewall functionality, application functionality, or load balancing functionality. Other server types may also be used.

Some embodiments include a first server 106a that receives requests from a client machine 240, forwards the request to a second server 106b, and responds to the request generated by the client machine 240 with a response from the second server 106b. First server 106a may acquire an enumeration of applications available to the client machine 240 and well as address information associated with an application server 206 hosting an application identified within the enumeration of applications. First server 106a can then present a response to the client's request using a web interface, and communicate directly with the client 240 to provide the client 240 with access to an identified application. One or more clients 240 and/or one or more servers 206 may transmit data over network 230, e.g., network 101.

FIG. 2 shows a high-level architecture of an illustrative desktop virtualization system. As shown, the desktop virtualization system may be single-server or multi-server system, or cloud system, including at least one virtualization server 206 configured to provide virtual desktops and/or virtual applications to one or more client access devices 240. As used herein, a desktop refers to a graphical environment or space in which one or more applications may be hosted and/or executed. A desktop may include a graphical shell providing a user interface for an instance of an operating system in which local and/or remote applications can be integrated. Applications may include programs that execute after an instance of an operating system (and, optionally, also the desktop) has been loaded. Each instance of the operating system may be physical (e.g., one operating system per device) or virtual (e.g., many instances of an OS running on a single device). Each application may be executed on a local device, or executed on a remotely located device (e.g., remoted).

Figure 3:
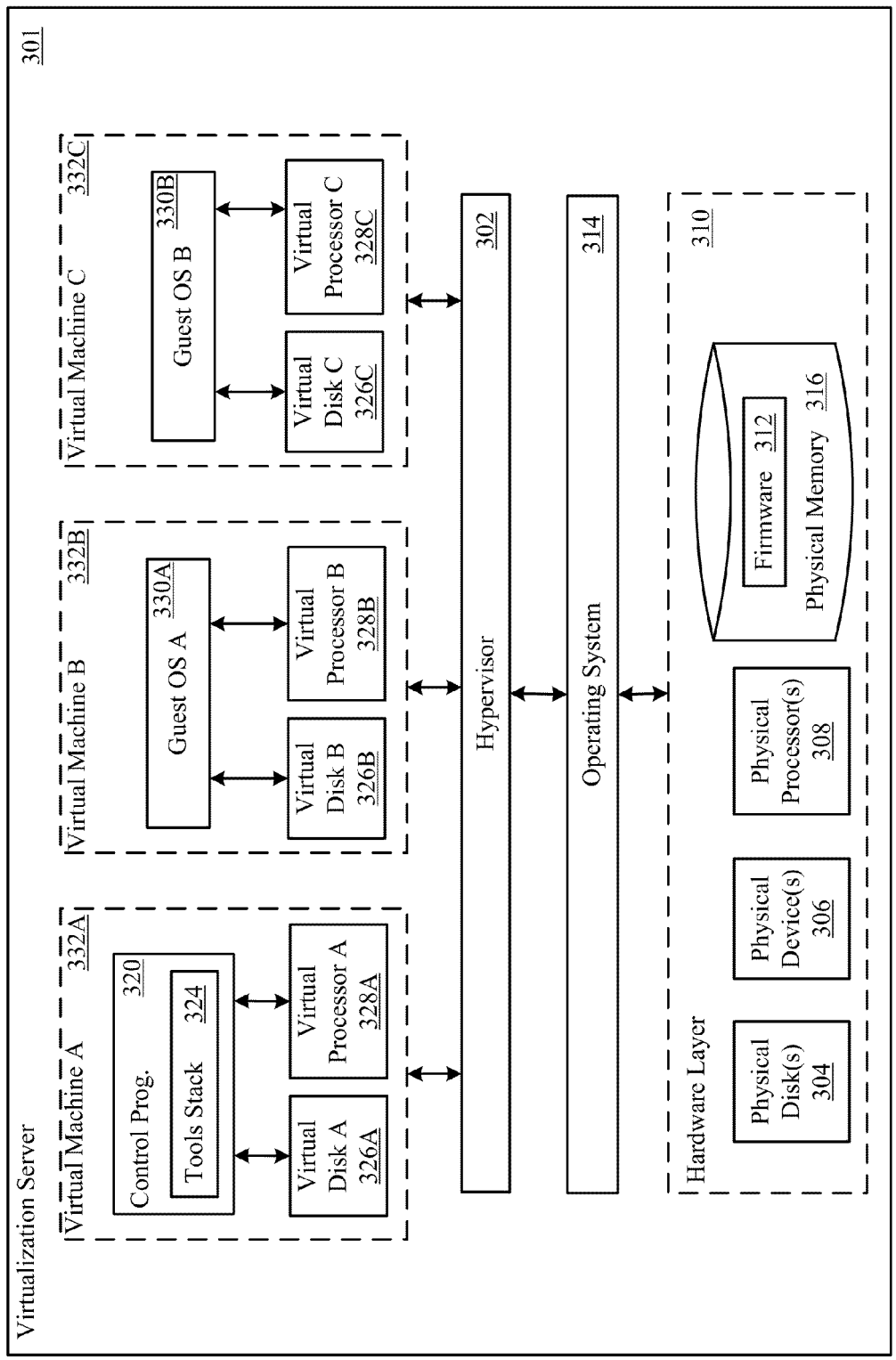
FIG. 3 depicts an illustrative virtualized (hypervisor) system architecture that may be used in accordance with one or more illustrative aspects described herein.

With further reference to FIG. 3, a computer device 301 may be configured as a virtualization server in a virtualization environment, for example, a single-server, multi-server, or cloud computing environment. Virtualization server 301 illustrated in FIG. 3 can be deployed as and/or implemented by one or more embodiments of the server 206 illustrated in FIG. 2 or by other known computing devices. Included in virtualization server 301 is a hardware layer that can include one or more physical disks 304, one or more physical devices 306, one or more physical processors 308 and one or more physical memories 316. In some embodiments, firmware 312 can be stored within a memory element in the physical memory 316 and can be executed by one or more of the physical processors 308. Virtualization server 301 may further include an operating system 314 that may be stored in a memory element in the physical memory 316 and executed by one or more of the physical processors 308. Still further, a hypervisor 302 may be stored in a memory element in the physical memory 316 and can be executed by one or more of the physical processors 308.

Executing on one or more of the physical processors 308 may be one or more virtual machines 332A-C (generally 332). Each virtual machine 332 may have a virtual disk 326A-C and a virtual processor 328A-C. In some embodiments, a first virtual machine 332A may execute, using a virtual processor 328A, a control program 320 that includes a tools stack 324. Control program 320 may be referred to as a control virtual machine, Dom0, Domain 0, or other virtual machine used for system administration and/or control. In some embodiments, one or more virtual machines 332B-C can execute, using a virtual processor 328B-C, a guest operating system 330A-B.

Virtualization server 301 may include a hardware layer 310 with one or more pieces of hardware that communicate with the virtualization server 301. In some embodiments, the hardware layer 310 can include one or more physical disks 304, one or more physical devices 306, one or more physical processors 308, and one or more memory 216. Physical components 304, 306, 308, and 316 may include, for example, any of the components described above. Physical devices 306 may include, for example, a network interface card, a video card, a keyboard, a mouse, an input device, a monitor, a display device, speakers, an optical drive, a storage device, a universal serial bus connection, a printer, a scanner, a network element (e.g., router, firewall, network address translator, load balancer, virtual private network (VPN) gateway, Dynamic Host Configuration Protocol (DHCP) router, etc.), or any device connected to or communicating with virtualization server 301. Physical memory 316 in the hardware layer 310 may include any type of memory. Physical memory 316 may store data, and in some embodiments may store one or more programs, or set of executable instructions. FIG. 3 illustrates an embodiment where firmware 312 is stored within the physical memory 316 of virtualization server 301. Programs or executable instructions stored in the physical memory 316 can be executed by the one or more processors 308 of virtualization server 301.

Virtualization server 301 may also include a hypervisor 302. In some embodiments, hypervisor 302 may be a program executed by processors 308 on virtualization server 301 to create and manage any number of virtual machines 332. Hypervisor 302 may be referred to as a virtual machine monitor, or platform virtualization software. In some embodiments, hypervisor 302 can be any combination of executable instructions and hardware that monitors virtual machines executing on a computing machine. Hypervisor 302 may be Type 2 hypervisor, where the hypervisor that executes within an operating system 314 executing on the virtualization server 301. Virtual machines then execute at a level above the hypervisor. In some embodiments, the Type 2 hypervisor executes within the context of a user's operating system such that the Type 2 hypervisor interacts with the user's operating system. In other embodiments, one or more virtualization servers 201 in a virtualization environment may instead include a Type 1 hypervisor (Not Shown). A Type 1 hypervisor may execute on the virtualization server 301 by directly accessing the hardware and resources within the hardware layer 310. That is, while a Type 2 hypervisor 302 accesses system resources through a host operating system 314, as shown, a Type 1 hypervisor may directly access all system resources without the host operating system 314. A Type 1 hypervisor may execute directly on one or more physical processors 308 of virtualization server 301, and may include program data stored in the physical memory 316.

Hypervisor 302, in some embodiments, can provide virtual resources to operating systems 330 or control programs 320 executing on virtual machines 332 in any manner that simulates the operating systems 330 or control programs 320 having direct access to system resources. System resources can include, but are not limited to, physical devices 306, physical disks 304, physical processors 308, physical memory 316 and any other component included in virtualization server 301 hardware layer 310. Hypervisor 302 may be used to emulate virtual hardware, partition physical hardware, virtualize physical hardware, and/or execute virtual machines that provide access to computing environments. In still other embodiments, hypervisor 302 controls processor scheduling and memory partitioning for a virtual machine 332 executing on virtualization server 301. Hypervisor 302 may include those manufactured by VMWare, Inc., of Palo Alto, Calif.; the XEN hypervisor, an open source product whose development is overseen by the open source Xen.org community; HyperV, VirtualServer or virtual PC hypervisors provided by Microsoft, or others. In some embodiments, virtualization server 301 executes a hypervisor 302 that creates a virtual machine platform on which guest operating systems may execute. In these embodiments, the virtualization server 301 may be referred to as a host server. An example of such a virtualization server is the XEN SERVER provided by Citrix Systems, Inc., of Fort Lauderdale, Fla.

Hypervisor 302 may create one or more virtual machines 332B-C (generally 332) in which guest operating systems 330 execute. In some embodiments, hypervisor 302 may load a virtual machine image to create a virtual machine 332. In other embodiments, the hypervisor 302 may executes a guest operating system 330 within virtual machine 332. In still other embodiments, virtual machine 332 may execute guest operating system 330.

In addition to creating virtual machines 332, hypervisor 302 may control the execution of at least one virtual machine 332. In other embodiments, hypervisor 302 may presents at least one virtual machine 332 with an abstraction of at least one hardware resource provided by the virtualization server 301 (e.g., any hardware resource available within the hardware layer 310). In other embodiments, hypervisor 302 may control the manner in which virtual machines 332 access physical processors 308 available in virtualization server 301. Controlling access to physical processors 308 may include determining whether a virtual machine 332 should have access to a processor 308, and how physical processor capabilities are presented to the virtual machine 332.

As shown in FIG. 3, virtualization server 301 may host or execute one or more virtual machines 332. A virtual machine 332 is a set of executable instructions that, when executed by a processor 308, imitate the operation of a physical computer such that the virtual machine 332 can execute programs and processes much like a physical computing device. While FIG. 3 illustrates an embodiment where a virtualization server 301 hosts three virtual machines 332, in other embodiments virtualization server 301 can host any number of virtual machines 332. Hypervisor 302, in some embodiments, provides each virtual machine 332 with a unique virtual view of the physical hardware, memory, processor and other system resources available to that virtual machine 332. In some embodiments, the unique virtual view can be based on one or more of virtual machine permissions, application of a policy engine to one or more virtual machine identifiers, a user accessing a virtual machine, the applications executing on a virtual machine, networks accessed by a virtual machine, or any other desired criteria. For instance, hypervisor 302 may create one or more unsecure virtual machines 332 and one or more secure virtual machines 332. Unsecure virtual machines 332 may be prevented from accessing resources, hardware, memory locations, and programs that secure virtual machines 332 may be permitted to access. In other embodiments, hypervisor 302 may provide each virtual machine 332 with a substantially similar virtual view of the physical hardware, memory, processor and other system resources available to the virtual machines 332.

Each virtual machine 332 may include a virtual disk 326A-C (generally 326) and a virtual processor 328A-C (generally 328.) The virtual disk 326, in some embodiments, is a virtualized view of one or more physical disks 304 of the virtualization server 301, or a portion of one or more physical disks 304 of the virtualization server 301. The virtualized view of the physical disks 304 can be generated, provided and managed by the hypervisor 302. In some embodiments, hypervisor 302 provides each virtual machine 332 with a unique view of the physical disks 304. Thus, in these embodiments, the particular virtual disk 326 included in each virtual machine 332 can be unique when compared with the other virtual disks 326.

A virtual processor 328 can be a virtualized view of one or more physical processors 308 of the virtualization server 301. In some embodiments, the virtualized view of the physical processors 308 can be generated, provided and managed by hypervisor 302. In some embodiments, virtual processor 328 has substantially all of the same characteristics of at least one physical processor 308. In other embodiments, virtual processor 308 provides a modified view of physical processors 308 such that at least some of the characteristics of the virtual processor 328 are different than the characteristics of the corresponding physical processor 308.

Figure 4:
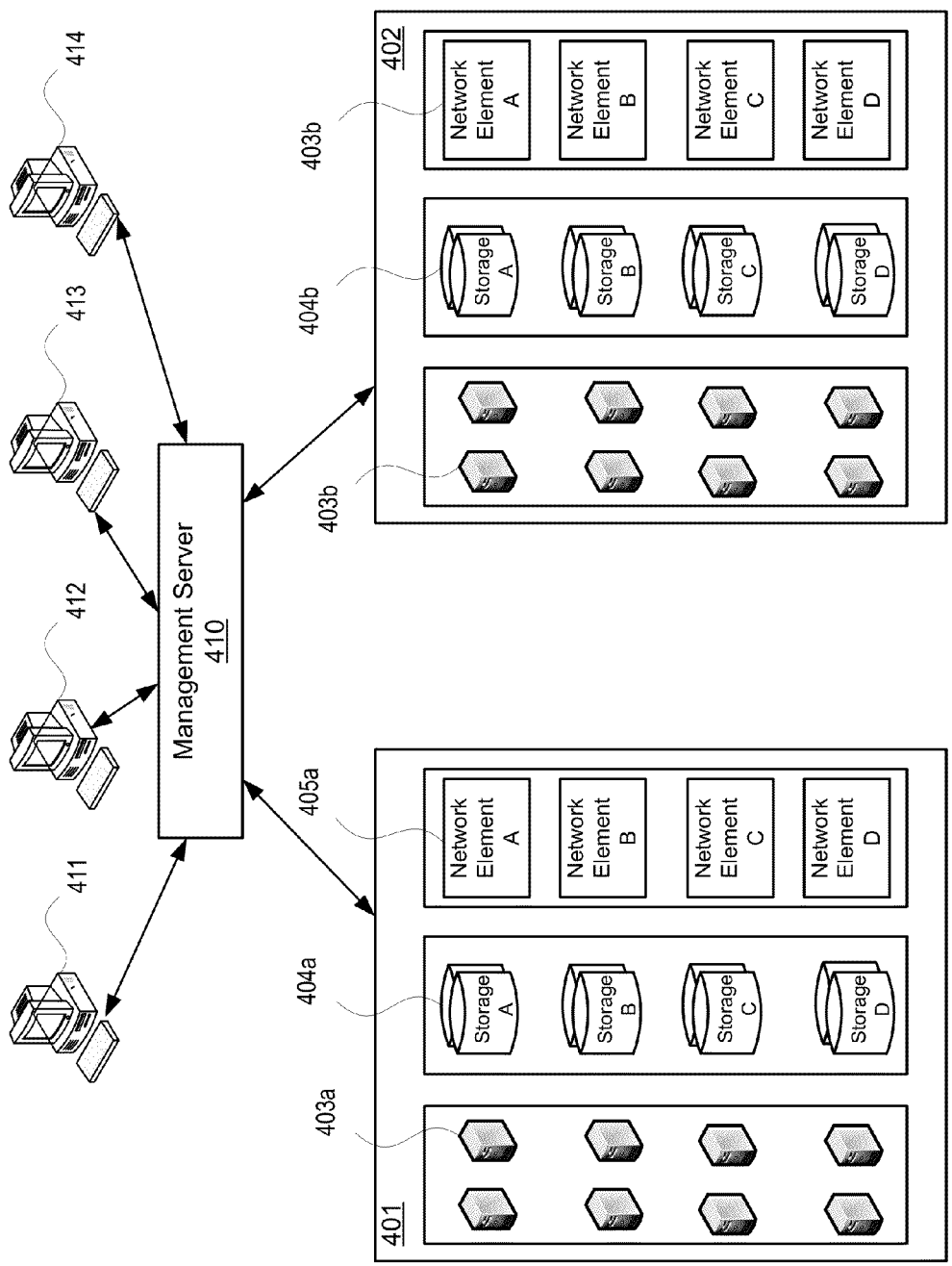
FIG. 4 depicts an illustrative cloud-based system architecture that may be used in accordance with one or more illustrative aspects described herein.

With further reference to FIG. 4, some aspects described herein may be implemented in a cloud-based environment. FIG. 4 illustrates an example of a cloud computing environment (or cloud system) 400. As seen in FIG. 4, client computers 411-414 may communicate with a cloud management server 410 to access the computing resources (e.g., host servers 403, storage resources 404, and network resources 405) of the cloud system.

Management server 410 may be implemented on one or more physical servers. The management server 410 may run, for example, CLOUDSTACK by Citrix Systems, Inc. of Ft. Lauderdale, Fla., or OPENSTACK, among others. Management server 410 may manage various computing resources, including cloud hardware and software resources, for example, host computers 403, data storage devices 404, and networking devices 405. The cloud hardware and software resources may include private and/or public components. For example, a cloud may be configured as a private cloud to be used by one or more particular customers or client computers 411-414 and/or over a private network. In other embodiments, public clouds or hybrid public-private clouds may be used by other customers over an open or hybrid networks.

Management server 410 may be configured to provide user interfaces through which cloud operators and cloud customers may interact with the cloud system. For example, the management server 410 may provide a set of APIs and/or one or more cloud operator console applications (e.g., web-based on standalone applications) with user interfaces to allow cloud operators to manage the cloud resources, configure the virtualization layer, manage customer accounts, and perform other cloud administration tasks. The management server 410 also may include a set of APIs and/or one or more customer console applications with user interfaces configured to receive cloud computing requests from end users via client computers 411-414, for example, requests to create, modify, or destroy virtual machines within the cloud. Client computers 411-414 may connect to management server 410 via the Internet or other communication network, and may request access to one or more of the computing resources managed by management server 410. In response to client requests, the management server 410 may include a resource manager configured to select and provision physical resources in the hardware layer of the cloud system based on the client requests. For example, the management server 410 and additional components of the cloud system may be configured to provision, create, and manage virtual machines and their operating environments (e.g., hypervisors, storage resources, services offered by the network elements, etc.) for customers at client computers 411-414, over a network (e.g., the Internet), providing customers with computational resources, data storage services, networking capabilities, and computer platform and application support. Cloud systems also may be configured to provide various specific services, including security systems, development environments, user interfaces, and the like.

Certain clients 411-414 may be related, for example, different client computers creating virtual machines on behalf of the same end user, or different users affiliated with the same company or organization. In other examples, certain clients 411-414 may be unrelated, such as users affiliated with different companies or organizations. For unrelated clients, information on the virtual machines or storage of any one user may be hidden from other users.

Referring now to the physical hardware layer of a cloud computing environment, availability zones 401-402 (or zones) may refer to a collocated set of physical computing resources. Zones may be geographically separated from other zones in the overall cloud of computing resources. For example, zone 401 may be a first cloud datacenter located in California, and zone 402 may be a second cloud datacenter located in Florida. Management sever 410 may be located at one of the availability zones, or at a separate location. Each zone may include an internal network that interfaces with devices that are outside of the zone, such as the management server 410, through a gateway. End users of the cloud (e.g., clients 411-414) might or might not be aware of the distinctions between zones. For example, an end user may request the creation of a virtual machine having a specified amount of memory, processing power, and network capabilities. The management server 410 may respond to the user's request and may allocate the resources to create the virtual machine without the user knowing whether the virtual machine was created using resources from zone 401 or zone 402. In other examples, the cloud system may allow end users to request that virtual machines (or other cloud resources) are allocated in a specific zone or on specific resources 403-405 within a zone.

In this example, each zone 401-402 may include an arrangement of various physical hardware components (or computing resources) 403-405, for example, physical hosting resources (or processing resources), physical network resources, physical storage resources, switches, and additional hardware resources that may be used to provide cloud computing services to customers. The physical hosting resources in a cloud zone 401-402 may include one or more computer servers 403, such as the virtualization servers 301 described above, which may be configured to create and host virtual machine instances. The physical network resources in a cloud zone 401 or 402 may include one or more network elements 405 (e.g., network service providers) comprising hardware and/or software configured to provide a network service to cloud customers, such as firewalls, network address translators, load balancers, virtual private network (VPN) gateways, Dynamic Host Configuration Protocol (DHCP) routers, and the like. The storage resources in the cloud zone 401-402 may include storage disks (e.g., solid state drives (SSDs), magnetic hard disks, etc.) and other storage devices.

The example cloud computing environment shown in FIG. 4 also may include a virtualization layer (e.g., as shown in FIGS. 1-3) with additional hardware and/or software resources configured to create and manage virtual machines and provide other services to customers using the physical resources in the cloud. The virtualization layer may include hypervisors, as described above in FIG. 3, along with other components to provide network virtualizations, storage virtualizations, etc. The virtualization layer may be as a separate layer from the physical resource layer, or may share some or all of the same hardware and/or software resources with the physical resource layer. For example, the virtualization layer may include a hypervisor installed in each of the virtualization servers 403 with the physical computing resources. Known cloud systems may alternatively be used, e.g., WINDOWS AZURE (Microsoft Corporation of Redmond Wash.), AMAZON EC2 (Amazon.com Inc. of Seattle, Wash.), IBM BLUE CLOUD (IBM Corporation of Armonk, N.Y.), or others.

Enterprise Mobility Management Architecture

Figure 5:
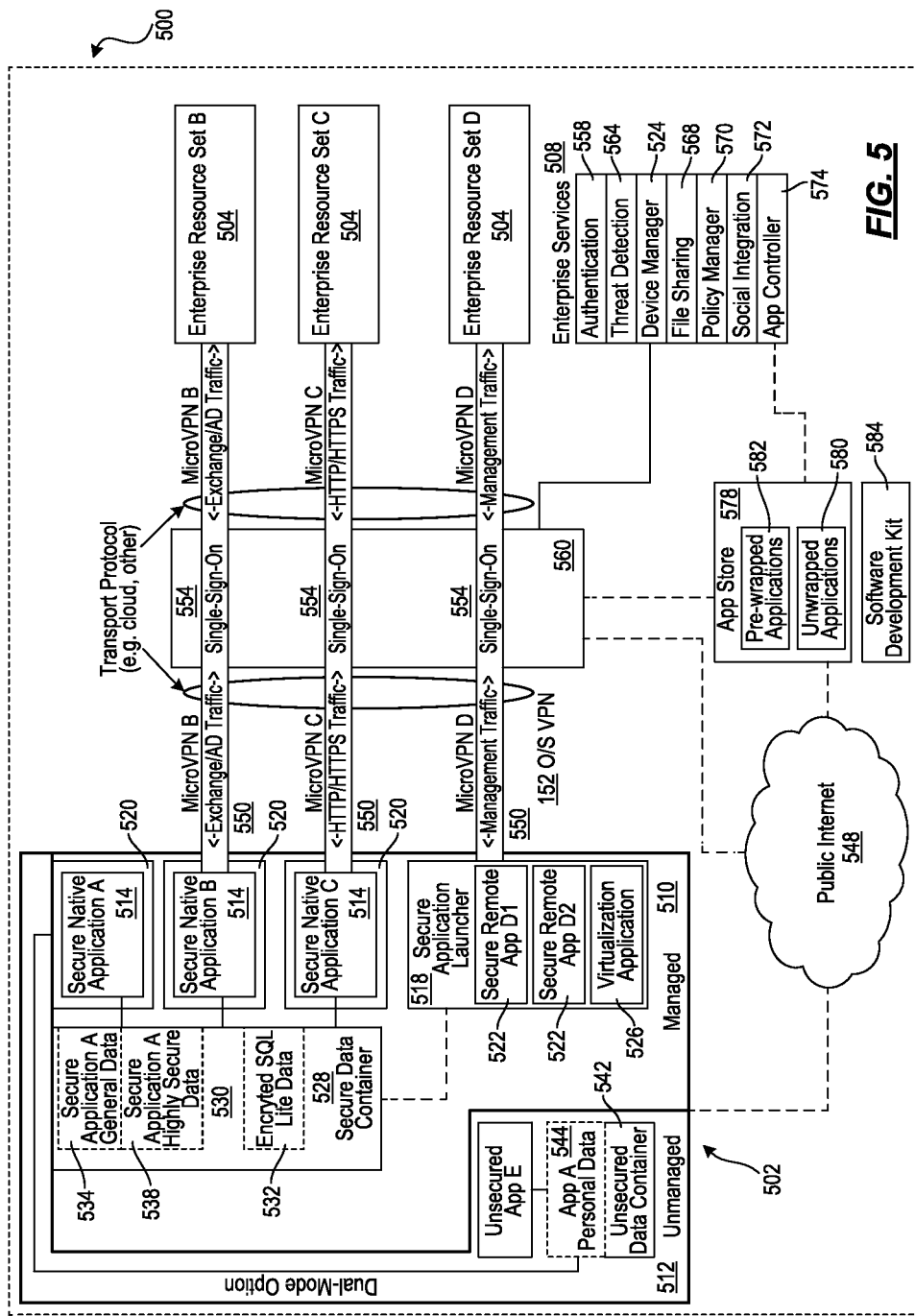
FIG. 5 depicts an illustrative enterprise mobility management system.

FIG. 5 represents an enterprise mobility technical architecture 500 for use in a BYOD environment. The architecture enables a user of a mobile device 502 to both access enterprise or personal resources from a mobile device 502 and use the mobile device 502 for personal use. The user may access such enterprise resources 504 or enterprise services 508 using a mobile device 502 that is purchased by the user or a mobile device 502 that is provided by the enterprise to user. The user may utilize the mobile device 502 for business use only or for business and personal use. The mobile device may run an iOS operating system, and Android operating system, or the like. The enterprise may choose to implement policies to manage the mobile device 504. The policies may be implanted through a firewall or gateway in such a way that the mobile device may be identified, secured or security verified, and provided selective or full access to the enterprise resources. The policies may be mobile device management policies, mobile application management policies, mobile data management policies, or some combination of mobile device, application, and data management policies. A mobile device 504 that is managed through the application of mobile device management policies may be referred to as an enrolled device.

The operating system of the mobile device may be separated into a managed partition 510 and an unmanaged partition 512. The managed partition 510 may have policies applied to it to secure the applications running on and data stored in the managed partition. The applications running on the managed partition may be secure applications. The secure applications may be email applications, web browsing applications, software-as-a-service (SaaS) access applications, Windows Application access applications, and the like. The secure applications may be secure native applications 514, secure remote applications 522 executed by a secure application launcher 518, virtualization applications 526 executed by a secure application launcher 518, and the like. The secure native applications 514 may be wrapped by a secure application wrapper 520. The secure application wrapper 520 may include integrated policies that are executed on the mobile device 502 when the secure native application is executed on the device. The secure application wrapper 520 may include meta-data that points the secure native application 514 running on the mobile device 502 to the resources hosted at the enterprise that the secure native application 514 may require to complete the task requested upon execution of the secure native application 514. The secure remote applications 522 executed by a secure application launcher 518 may be executed within the secure application launcher application 518. The virtualization applications 526 executed by a secure application launcher 518 may utilize resources on the mobile device 502, at the enterprise resources 504, and the like. The resources used on the mobile device 502 by the virtualization applications 526 executed by a secure application launcher 518 may include user interaction resources, processing resources, and the like. The user interaction resources may be used to collect and transmit keyboard input, mouse input, camera input, tactile input, audio input, visual input, gesture input, and the like. The processing resources may be used to present a user interface, process data received from the enterprise resources 504, and the like. The resources used at the enterprise resources 504 by the virtualization applications 526 executed by a secure application launcher 518 may include user interface generation resources, processing resources, and the like. The user interface generation resources may be used to assemble a user interface, modify a user interface, refresh a user interface, and the like. The processing resources may be used to create information, read information, update information, delete information, and the like. For example, the virtualization application may record user interactions associated with a GUI and communicate them to a server application where the server application will use the user interaction data as an input to the application operating on the server. In this arrangement, an enterprise may elect to maintain the application on the server side as well as data, files, etc. associated with the application. While an enterprise may elect to "mobilize" some applications in accordance with the principles herein by securing them for deployment on the mobile device, this arrangement may also be elected for certain applications. For example, while some applications may be secured for use on the mobile device, others may not be prepared or appropriate for deployment on the mobile device so the enterprise may elect to provide the mobile user access to the unprepared applications through virtualization techniques. As another example, the enterprise may have large complex applications with large and complex data sets (e.g. material resource planning applications) where it would be very difficult, or otherwise undesirable, to customize the application for the mobile device so the enterprise may elect to provide access to the application through virtualization techniques. As yet another example, the enterprise may have an application that maintains highly secured data (e.g. human resources data, customer data, engineering data) that may be deemed by the enterprise as too sensitive for even the secured mobile environment so the enterprise may elect to use virtualization techniques to permit mobile access to such applications and data. An enterprise may elect to provide both fully secured and fully functional applications on the mobile device as well as a virtualization application to allow access to applications that are deemed more properly operated on the server side. In an embodiment, the virtualization application may store some data, files, etc. on the mobile phone in one of the secure storage locations. An enterprise, for example, may elect to allow certain information to be stored on the phone while not permitting other information.

In connection with the virtualization application, as described herein, the mobile device may have a virtualization application that is designed to present GUI's and then record user interactions with the GUI. The application may communicate the user interactions to the server side to be used by the server side application as user interactions with the application. In response, the application on the server side may transmit back to the mobile device a new GUI. For example, the new GUI may be a static page, a dynamic page, an animation, or the like.

The applications running on the managed partition may be stabilized applications. The stabilized applications may be managed by a device manager 524. The device manager 524 may monitor the stabilized applications and utilize techniques for detecting and remedying problems that would result in a destabilized application if such techniques were not utilized to detect and remedy the problems.

The secure applications may access data stored in a secure data container 528 in the managed partition 510 of the mobile device. The data secured in the secure data container may be accessed by the secure wrapped applications 514, applications executed by a secure application launcher 518, virtualization applications 526 executed by a secure application launcher 518, and the like. The data stored in the secure data container 528 may include files, databases, and the like. The data stored in the secure data container 528 may include data restricted to a specific secure application 530, shared among secure applications 532, and the like. Data restricted to a secure application may include secure general data 534 and highly secure data 538. Secure general data may use a strong form of encryption such as AES 128-bit encryption or the like, while highly secure data 538 may use a very strong form of encryption such as AES 256-bit encryption. Data stored in the secure data container 528 may be deleted from the device upon receipt of a command from the device manager 524. The secure applications may have a dual-mode option 540. The dual mode option 540 may present the user with an option to operate the secured application in an unsecured mode. In an unsecured mode, the secure applications may access data stored in an unsecured data container 542 on the unmanaged partition 512 of the mobile device 502. The data stored in an unsecured data container may be personal data 544. The data stored in an unsecured data container 542 may also be accessed by unsecured applications 548 that are running on the unmanaged partition 512 of the mobile device 502. The data stored in an unsecured data container 542 may remain on the mobile device 502 when the data stored in the secure data container 528 is deleted from the mobile device 502. An enterprise may want to delete from the mobile device selected or all data, files, and/or applications owned, licensed or controlled by the enterprise (enterprise data) while leaving or otherwise preserving personal data, files, and/or applications owned, licensed or controlled by the user (personal data). This operation may be referred to as a selective wipe. With the enterprise and personal data arranged in accordance to the aspects described herein, an enterprise may perform a selective wipe.

The mobile device may connect to enterprise resources 504 and enterprise services 508 at an enterprise, to the public Internet 548, and the like. The mobile device may connect to enterprise resources 504 and enterprise services 508 through virtual private network connections. The virtual private network connections may be specific to particular applications 550, particular devices, particular secured areas on the mobile device, and the like 552. For example, each of the wrapped applications in the secured area of the phone may access enterprise resources through an application specific VPN such that access to the VPN would be granted based on attributes associated with the application, possibly in conjunction with user or device attribute information. The virtual private network connections may carry Microsoft Exchange traffic, Microsoft Active Directory traffic, HTTP traffic, HTTPS traffic, application management traffic, and the like. The virtual private network connections may support and enable single-sign-on authentication processes 554. The single-sign-on processes may allow a user to provide a single set of authentication credentials, which are then verified by an authentication service 558. The authentication service 558 may then grant to the user access to multiple enterprise resources 504, without requiring the user to provide authentication credentials to each individual enterprise resource 504.

The virtual private network connections may be established and managed by an access gateway 560. The access gateway 560 may include performance enhancement features that manage, accelerate, and improve the delivery of enterprise resources 504 to the mobile device 502. The access gateway may also re-route traffic from the mobile device 502 to the public Internet 548, enabling the mobile device 502 to access publicly available and unsecured applications that run on the public Internet 548. The mobile device may connect to the access gateway via a transport network 562. The transport network 562 may be a wired network, wireless network, cloud network, local area network, metropolitan area network, wide area network, public network, private network, and the like.

The enterprise resources 504 may include email servers, file sharing servers, SaaS applications, Web application servers, Windows application servers, and the like. Email servers may include Exchange servers, Lotus Notes servers, and the like. File sharing servers may include ShareFile servers, and the like. SaaS applications may include Salesforce, and the like. Windows application servers may include any application server that is built to provide applications that are intended to run on a local Windows operating system, and the like. The enterprise resources 504 may be premise-based resources, cloud based resources, and the like. The enterprise resources 504 may be accessed by the mobile device 502 directly or through the access gateway 560. The enterprise resources 504 may be accessed by the mobile device 502 via a transport network 562. The transport network 562 may be a wired network, wireless network, cloud network, local area network, metropolitan area network, wide area network, public network, private network, and the like.

The enterprise services 508 may include authentication services 558, threat detection services 564, device manager services 524, file sharing services 568, policy manager services 570, social integration services 572, application controller services 574, and the like. Authentication services 558 may include user authentication services, device authentication services, application authentication services, data authentication services and the like. Authentication services 558 may use certificates. The certificates may be stored on the mobile device 502, by the enterprise resources 504, and the like. The certificates stored on the mobile device 502 may be stored in an encrypted location on the mobile device, the certificate may be temporarily stored on the mobile device 502 for use at the time of authentication, and the like. Threat detection services 564 may include intrusion detection services, unauthorized access attempt detection services, and the like. Unauthorized access attempt detection services may include unauthorized attempts to access devices, applications, data, and the like. Device management services 524 may include configuration, provisioning, security, support, monitoring, reporting, and decommissioning services. File sharing services 568 may include file management services, file storage services, file collaboration services, and the like.

Policy manager services 570 may include device policy manager services, application policy manager services, data policy manager services, and the like. Social integration services 572 may include contact integration services, collaboration services, integration with social networks such as Facebook, Twitter, and LinkedIn, and the like. Application controller services 574 may include management services, provisioning services, deployment services, assignment services, revocation services, wrapping services, and the like.

The enterprise mobility technical architecture 500 may include an application store 578. The application store 578 may include unwrapped applications 580, pre-wrapped applications 582, and the like. Applications may be populated in the application store 578 from the application controller 574. The application store 578 may be accessed by the mobile device 502 through the access gateway 560, through the public Internet 548, or the like. The application store may be provided with an intuitive and easy to use User Interface. The application store 578 may provide access to a software development kit 584. The software development kit 584 may provide a user the capability to secure applications selected by the user by wrapping the application as described previously in this description. An application that has been wrapped using the software development kit 584 may then be made available to the mobile device 502 by populating it in the application store 578 using the application controller 574.

The enterprise mobility technical architecture 500 may include a management and analytics capability 588. The management and analytics capability 588 may provide information related to how resources are used, how often resources are used, and the like. Resources may include devices, applications, data, and the like. How resources are used may include which devices download which applications, which applications access which data, and the like. How often resources are used may include how often an application has been downloaded, how many times a specific set of data has been accessed by an application, and the like.

Figure 6:
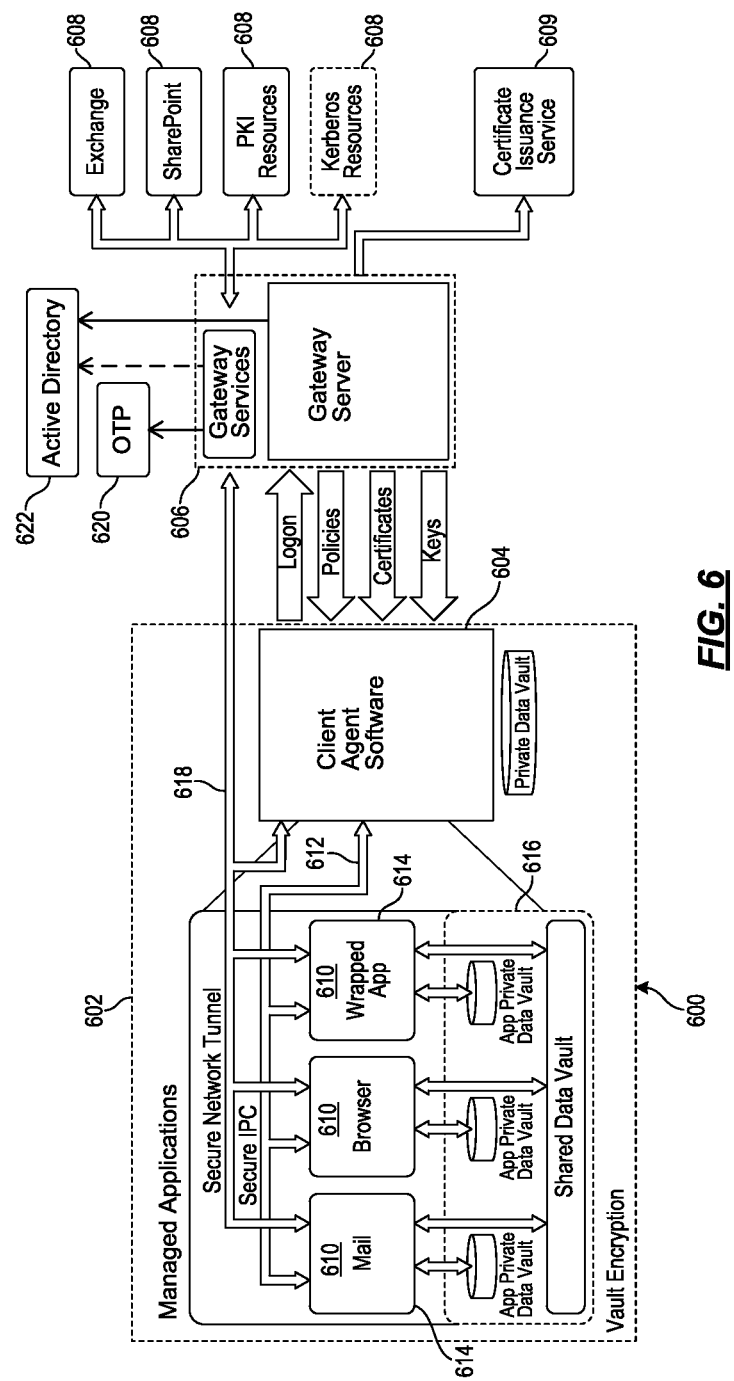
FIG. 6 depicts another illustrative enterprise mobility management system.

FIG. 6 is another illustrative enterprise mobility management system 600. Some of the components of the mobility management system 500 described above with reference to FIG. 5 have been omitted for the sake of simplicity. The architecture of the system 600 depicted in FIG. 6 is similar in many respects to the architecture of the system 500 described above with reference to FIG. 5 and may include additional features not mentioned above.

In this case, the left hand side represents an enrolled mobile device 602 with a client agent 604. The client agent 604 may comprise an agent running on a remote or mobile device. The client agent 604 may interact with a gateway server 606 comprising cloud resources for remote devices. Gateway server 606 may be used to access various enterprise resources 608 and services 609 such as Exchange, Sharepoint, PKI Resources, Kerberos Resources, Certificate Issuance service, as shown on the right hand side above. Although not specifically shown, the mobile device 602 may also interact with an enterprise application store (StoreFront) for the selection and downloading of applications.

The client agent 604 acts as the UI (user interface) intermediary for Windows apps/desktops hosted in an Enterprise data center, which are accessed using the HDX/ICA display remoting protocol. The client agent 604 also supports the installation and management of native applications on the mobile device 602, such as native iOS or Android applications. For example, the managed applications 610 (mail, browser, wrapped application) shown in the figure above are all native applications that execute locally on the device. The client agent 604 and mobile application management protocol (hereinafter "MAMP," for short), such as mobile experience technology (MDX), of this architecture act to provide policy driven management capabilities and features such as connectivity and SSO (single sign on) to enterprise resources/services 608. The client agent 604 handles primary user authentication to the enterprise, such as to gateway server 606 components. The client agent 604 obtains policies from gateway server 606 to control the behavior of the MAMP managed applications 610 on the mobile device 602.

The Secure IPC links 612 between the native applications 610 and the client agent 604 represent a management channel, which allows the client agent to supply policies to be enforced by the MAMP framework 614 "wrapping" each application. A MAMP-enabled application on the mobile device 602 may incorporate MAMP by direct linking or by a wrapping process. Accordingly, MAMP may be used to manage applications on the mobile device 602. For the sake of brevity, MAMP is used herein to describe a protocol for managing an application. However, any protocol that provides an agent on the mobile device that can manage applications on the mobile device 602 may be used, including any agents that can receive information from a server and perform diagnostics on the mobile device 602 or a mobile application. The IPC channel 612 also allows the client agent 604 to supply credential and authentication information that enables connectivity and SSO to enterprise resources 608. Finally the IPC channel 612 allows the MAMP framework 614 to invoke user interface functions implemented by the client agent 604, such as online and offline authentication.

Communications between the client agent 604 and gateway server 606 are essentially an extension of the management channel from the MAMP framework 614 wrapping each native managed application 610. The MAMP framework 614 requests policy information from the client agent 604, which in turn requests it from gateway server 606. The MAMP framework 614 requests authentication, and the client agent 604 logs into the gateway services part of gateway server 606 (also known as NetScaler Access Gateway). The client agent 604 may also call supporting services on gateway server 606, which may produce input material to derive encryption keys for the local data vaults 616, or provide client certificates which may enable direct authentication to PKI protected resources, as more fully explained below.

In more detail, the MAMP Framework 614 "wraps" each managed application 610. This may be incorporated via an explicit build step, or via a post-build processing step. The MAMP Framework 614 may "pair" with the client agent 604 on first launch of an application 610 to initialize the Secure IPC channel and obtain the policy for that application. The MAMP Framework 614 may enforce relevant portions of the policy that apply locally, such as the client agent login dependencies and some of the containment policies that restrict how local OS services may be used, or how they may interact with the application 610.

The MAMP Framework 614 may use services provided by the client agent 604 over the Secure IPC channel 612 to facilitate authentication and internal network access. Key management for the private and shared data vaults 616 (containers) may be also managed by appropriate interactions between the managed applications 610 and the client agent 604. Vaults 616 may be available only after online authentication, or may be made available after offline authentication if allowed by policy. First use of vaults 616 may require online authentication, and offline access may be limited to at most the policy refresh period before online authentication is again required.

Network access to internal resources may occur directly from individual managed applications 610 through Access Gateway 606. The MAMP Framework 614 is responsible for orchestrating the network access on behalf of each application 610. The client agent 604 may facilitate these network connections by providing suitable time limited secondary credentials obtained following online authentication. Multiple modes of network connection may be used, such as reverse web proxy connections and end-to-end VPN-style tunnels 618.

The Mail and Browser managed applications 610 have special status and may make use of facilities that might not be generally available to arbitrary wrapped applications. For example, the Mail application may use a special background network access mechanism that allows it to access Exchange over an extended period of time without requiring a full AG logon. The Browser application may use multiple private data vaults to segregate different kinds of data.

This architecture supports the incorporation of various other security features. For example, gateway server 606 (including its gateway services) in some cases will not need to validate AD passwords. It can be left to the discretion of an enterprise whether an AD password is used as an authentication factor for some users in some situations. Different authentication methods may be used if a user is online or offline (i.e., connected or not connected to a network).

Step up authentication is a feature wherein gateway server 606 may identify managed native applications 610 that are allowed to have access to highly classified data requiring strong authentication, and ensure that access to these applications is only permitted after performing appropriate authentication, even if this means a re-authentication is required by the user after a prior weaker level of login.

Another security feature of this solution is the encryption of the data vaults 616 (containers) on the mobile device 602. The vaults 616 may be encrypted so that all on-device data including files, databases, and configurations are protected. For on-line vaults, the keys may be stored on the server (gateway server), and for off-line vaults, a local copy of the keys may be protected by a user password. When data is stored locally on the device 602 in the secure container 616, it is preferred that a minimum of AES 256 encryption algorithm be utilized.

Other secure container features may also be implemented. For example, a logging feature may be included, wherein all security events happening inside an application 610 are logged and reported to the backend. Data wiping may be supported, such as if the application 610 detects tampering, associated encryption keys may be written over with random data, leaving no hint on the file system that user data was destroyed. Screenshot protection is another feature, where an application may prevent any data from being stored in screenshots. For example, the key window's hidden property may be set to YES. This may cause whatever content is currently displayed on the screen to be hidden, resulting in a blank screenshot where any content would normally reside.

Local data transfer may be prevented, such as by preventing any data from being locally transferred outside the application container, e.g., by copying it or sending it to an external application. A keyboard cache feature may operate to disable the autocorrect functionality for sensitive text fields. SSL certificate validation may be operable so the application specifically validates the server SSL certificate instead of it being stored in the keychain. An encryption key generation feature may be used such that the key used to encrypt data on the device is generated using a passphrase supplied by the user (if offline access is required). It may be XORed with another key randomly generated and stored on the server side if offline access is not required. Key Derivation functions may operate such that keys generated from the user password use KDFs (key derivation functions, notably PBKDF2) rather than creating a cryptographic hash of it. The latter makes a key susceptible to brute force or dictionary attacks.

Further, one or more initialization vectors may be used in encryption methods. An initialization vector will cause multiple copies of the same encrypted data to yield different cipher text output, preventing both replay and cryptanalytic attacks. This will also prevent an attacker from decrypting any data even with a stolen encryption key if the specific initialization vector used to encrypt the data is not known. Further, authentication then decryption may be used, wherein application data is decrypted only after the user has authenticated within the application. Another feature may relate to sensitive data in memory, which may be kept in memory (and not in disk) only when it's needed. For example, login credentials may be wiped from memory after login, and encryption keys and other data inside objective-C instance variables are not stored, as they may be easily referenced. Instead, memory may be manually allocated for these.

An inactivity timeout may be implemented, wherein after a policy-defined period of inactivity, a user session is terminated.

Data leakage from the MAMP framework 614 may be prevented in other ways. For example, when an application 610 is put in the background, the memory may be cleared after a predetermined (configurable) time period. When backgrounded, a snapshot may be taken of the last displayed screen of the application to fasten the foregrounding process. The screenshot may contain confidential data and hence should be cleared.

Another security feature relates to the use of an OTP (one time password) 620 without the use of an AD (active directory) 622 password for access to one or more applications. In some cases, some users do not know (or are not permitted to know) their AD password, so these users may authenticate using an OTP 620 such as by using a hardware OTP system like SecurID (OTPs may be provided by different vendors also, such as Entrust or Gemalto). In some cases, after a user authenticates with a user ID, a text is sent to the user with an OTP 620. In some cases, this may be implemented only for online use, with a prompt being a single field.

An offline password may be implemented for offline authentication for those applications 610 for which offline use is permitted via enterprise policy. For example, an enterprise may want StoreFront to be accessed in this manner. In this case, the client agent 604 may require the user to set a custom offline password and the AD password is not used. The gateway server 606 may provide policies to control and enforce password standards with respect to the minimum length, character class composition, and age of passwords, such as described by the standard Windows Server password complexity requirements, although these requirements may be modified.

Another feature relates to the enablement of a client side certificate for certain applications 610 as secondary credentials (for the purpose of accessing PKI protected web resources via the MAMP micro VPN feature). For example, an application such as @WorkMail may utilize such a certificate. In this case, certificate-based authentication using ActiveSync protocol may be supported, wherein a certificate from the client agent 604 may be retrieved by the gateway server 606 and used in a keychain. Each managed application may have one associated client certificate, identified by a label that is defined in the gateway server.

The gateway server 606 may interact with an Enterprise special purpose web service to support the issuance of client certificates to allow relevant managed applications to authenticate to internal PKI protected resources.

The client agent 604 and the MAMP Framework 614 may be enhanced to support obtaining and using client certificates for authentication to internal PKI protected network resources. More than one certificate may be supported, such as to match various levels of security and/or separation requirements. The certificates may be used by the Mail and Browser managed applications, and ultimately by arbitrary wrapped applications (provided those applications use web service style communication patterns where it is reasonable for the MAMP Framework to mediate https requests).

MAMP client certificate support on iOS may rely on importing a PKCS 12 BLOB (Binary Large Object) into the iOS keychain in each managed application for each period of use. MAMP client certificate support may use a HTTPS implementation with private in-memory key storage. The client certificate will never be present in the iOS keychain and will not be persisted except potentially in "online-only" data value that is strongly protected.

Mutual SSL may also be implemented to provide additional security by requiring that a mobile device 602 is authenticated to the enterprise, and vice versa. Virtual smart cards for authentication to the gateway server 606 may also be implemented.

Both limited and full Kerberos support may be additional features. The full support feature relates to an ability to do full Kerberos login to AD 622, using an AD password or trusted client certificate, and obtain Kerberos service tickets to respond to HTTP Negotiate authentication challenges. The limited support feature relates to constrained delegation in AGEE, where AGEE supports invoking Kerberos protocol transition so it can obtain and use Kerberos service tickets (subject to constrained delegation) in response to HTTP Negotiate authentication challenges. This mechanism works in reverse web proxy (aka CVPN) mode, and when http (but not https) connections are proxied in VPN and MicroVPN mode.

Another feature relates to application container locking and wiping, which may automatically occur upon jail-break or rooting detections, and occur as a pushed command from administration console, and may include a remote wipe functionality even when an application 610 is not running.

A multi-site architecture or configuration of StoreFront and App Controller may be supported that allows users to be service from one of several different locations in case of failure.

In some cases, managed applications 610 may be allowed to access a certificate and private key via an API (example OpenSSL). Trusted managed applications 610 of an enterprise may be allowed to perform specific Public Key operations with an application's client certificate and private key. Various use cases may be identified and treated accordingly, such as when an application behaves like a browser and no certificate access is required, when an application reads a certificate for "who am I," when an application uses the certificate to build a secure session token, and when an application uses private keys for digital signing of important data (e.g. transaction log) or for temporary data encryption.

Secured Access to Resources Using a Proxy

Figure 7:
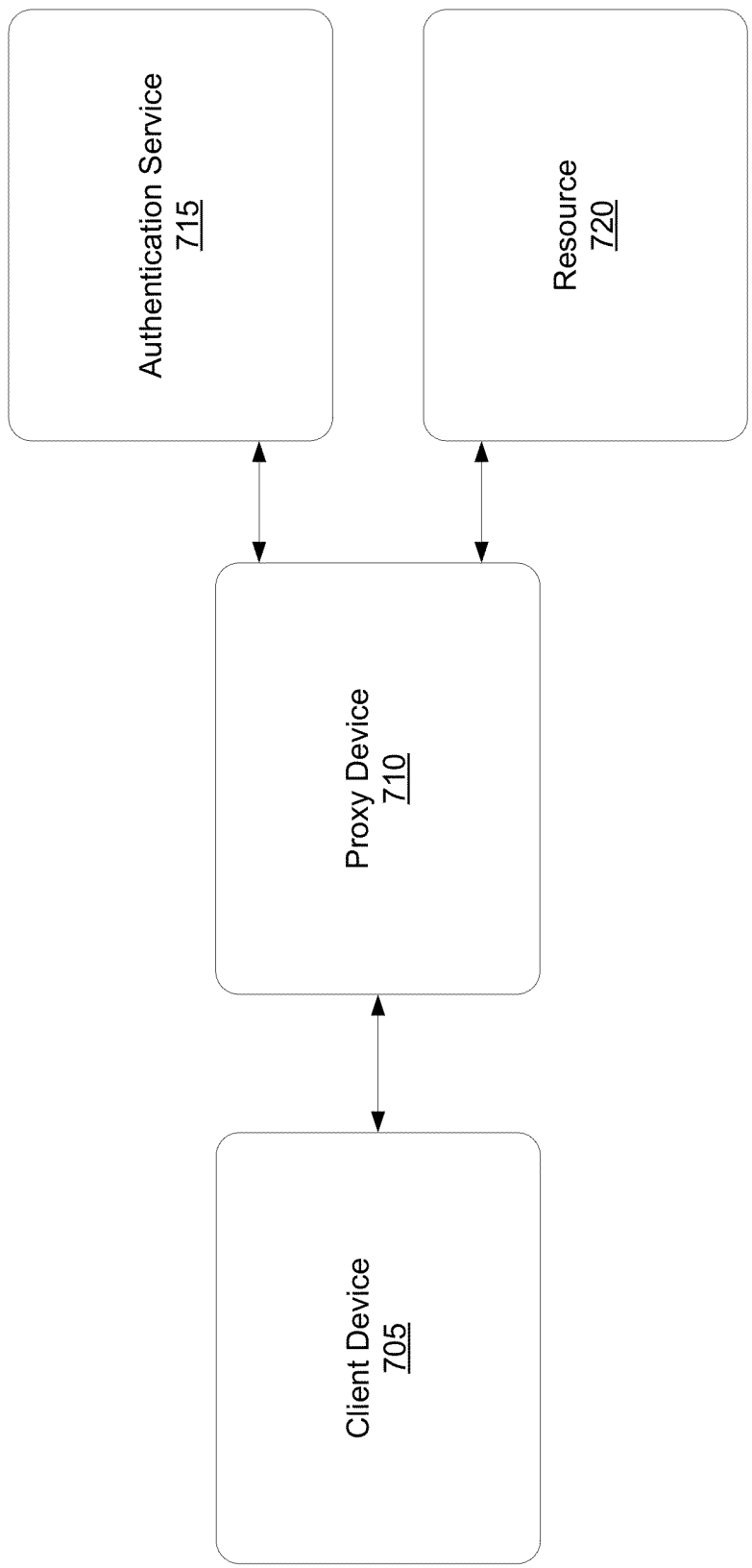
FIG. 7 depicts an illustrative system having a client, a proxy, resource(s), and/or authentication service(s).
Figure 8:
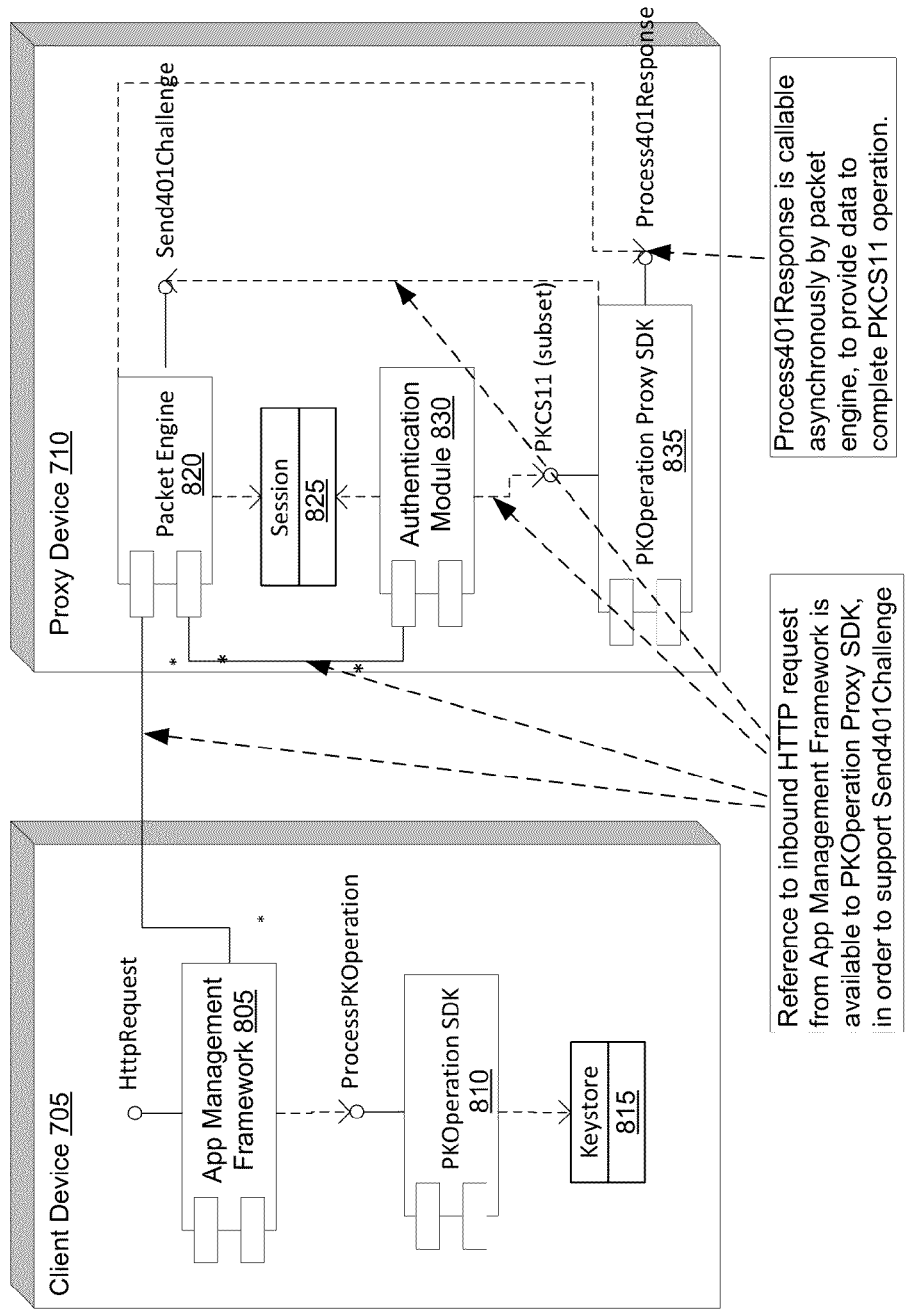
FIG. 8 depicts an illustrative detailed view of a client and a proxy.

FIG. 7 depicts an illustrative system having a client device 705, a proxy device 710, resource(s) 720, and/or authentication service(s) 715. FIG. 8 depicts an illustrative detailed view of the client device 705 and proxy device 710. These elements may implement one or more aspects described herein. A brief summary of these aspects will now be provided, with additional examples provided below. The client device 705 may communicate with one or more resources 720 and/or authentication services 715 using a proxy device 710. In some aspects, the client device 705 might not be configured to communicate directly with the resources 720 and/or authentication services 715. For example, the client device 705 and resources 720 may use different authentication and/or communication protocols. The proxy device 710 may translate between these different protocols. Additionally or alternatively, the proxy device 710 may provide additional benefits, as will be described in the examples below.

The client device 705 may send a request for resources 720, such as documents, emails, services, files, and the like, to the proxy device 710. The proxy device 710 may forward the request to the resource 720, and in response, authentication between the proxy device 710 and resource 720 may be initiated. At one or more points during the authentication, the resource 720 may request a signature, such as from a client certificate. The proxy device 710 might not directly have access to the client certificate, so the proxy device 710 may involve the client device 705 in the authentication process, such as if the client device 705 controls access to the client certificate. For example, the proxy device 710 may request that the client device 705 sign or decrypt an authentication message using the client certificate (or a private key included therein), or return a list of available security certificates or a selection by the user of a particular security certificate.

The proxy device 710 may provide the client device 705 with context information that identifies the authentication session between the proxy device 710 and the resource/authentication server. For example and as will be described in further detail in the examples below, the context information may identify a data structure of authentication information exchanged (or to be exchanged) between the proxy device 710 and resource 720 and/or the proxy device 710 and the authentication service 715. The client device 705 may use the context information to verify or otherwise confirm the authentication session between the proxy device 710 and the resource/authentication server. Once the context information is verified, the client device 705 may provide the requested signature to the proxy device 710, and the proxy device 710 may complete authentication with the resource 720 and/or the authentication service 715. Then, the proxy device 710 may retrieve the resource requested by the client device 705 and provide it to the client device 705.

The client device 705 may comprise any of an end point device, client computers 107 or 109, terminals 240, client computers 411-414, mobile device 502, mobile device 602, or any other device. For example, the mobile device may comprise any of a smartphone, a tablet, and the like. One or more applications may be running on the client device 705. An application may desire to access a protected resource, such as an enterprise resource, and a module included in the application (or other applications) may facilitate access to those protected resources. For example and with reference to FIG. 8, an application running on the client device 705 may send a request for a resource (e.g., an HTTP request) to MAMP Framework 805, which may facilitate communications with the proxy device 710. In some aspects, the MAMP Framework 805 may run as a privileged application on the client device 705. The MAMP Framework 805 may comprise all of or a portion of the functionalities provided by the MAMP framework 614, as previously described.

The client device 705 may also have a PKOperation SDK module 810 that facilitates access to a keystore 815 that stores one or more client certificates that may be used to sign for authentication purposes. For example, the client device 705 may authorize access to or have possession of client certificate representing the user of the client device 705. In some aspects, the certificate may be an enterprise-issued certificate. The certificate may be bound to a physical smart card having a cryptographic module. In other words, the cryptographic secret may be confined to the smart card. The user may authorize the client device 705 to access the smart card protected certificate. Alternatively, the certificate may be bound to a virtual smart card, which may use hardware and/or software modules to protect the key. The client device 705 and/or a removable hardware module of the client device 705 may be authorized by a provisioning process to store the certificate and private key. The user may be required to enter a PIN code using the client device 705 to authorize operations involving the client certificate private key. Another external device separate from the client device 705 (e.g., another smartphone) may control the certificate, and the client device 705 may utilize a custom reader interface to access the certificate controlled by the external device.

In some embodiments, the client certificate and/or private key might be confined to the client device 705 or to a physical smart card. Accordingly, the client device 705 may maintain control of the key. If authentication using the key is required, the client device 705 may need to be involved in the authentication process. This allows the client device 705 to have assurance that operations performed with the certificate private key are ones that the client device 705 intended. Some organizations may use smart cards to achieve non-repudiation for certain operations, which may require users to have authority over all uses of a certificate issued by the organization. For example, document signing may require explicit user authority, whereas authentication to certain systems might not require explicit user authority. Suitable mechanism(s) for providing such assurance may depend on the nature of the resource being accessed, the proxy device involved, and how the client device 705 operates.

The proxy device 710 may comprise one or more of a server (e.g., servers 201, 206, 301, 410), computing device, access gateway 560, gateway server 606, or any other device. The proxy device 710 may facilitate communications between the client device 705 and enterprise resources or other networks. For example, a user of the client device 705 may wish to access enterprise resources that require authentication, and the proxy device 710 may mediate access. The client device 705 may use the proxy device 710 to access resource if, for example, the client device 705 is not able to directly access the resources. For example, the client device 705 might not be configured for a protocol utilized by the enterprise resources. In some aspects, the enterprise resource may implement Kerberos with PKINIT for authentication, but the client device 705 might not implement Kerberos with PKINIT. Similarly, the enterprise resource may implement SSL with client certificate authentication, but the client device 705 might not implement SSL with client certificate authentication. Instead, the client device 705 and proxy device 710 may communicate using a protocol having standard components and fitting well-known authentication frameworks. The proxy device 710 may translate between a first protocol to the resource (e.g., Kerberos or SSL) and a second, different protocol to the client device 705 (e.g., HTTP or HTTPS). By utilizing the proxy device 710, client devices might not need to understand and operate a complex or different protocol used by the enterprise resource. In these examples, the proxy device 710 may play the client role. However, the proxy device 710 might not have control of the client certificate private key.

The proxy device 710 may be used to facilitate access to resources in other circumstances, such as if the client device 705 is not permitted to directly access the resources, if access capabilities of the client device 705 are limited, and/or if the proxy device 710 enhances access by improving performance or offering a preferable interface. The proxy device 710 may also facilitate enhanced security. For example, Kerberos resource authentication may require obtaining service tickets from Kerberos KDCs (e.g., Active Directory domain controllers). However, the KDCs themselves may comprise sensitive enterprise resources that should not be directly accessible to some client devices. For these cases. Kerberos authentication may require use of a trusted proxy device 710. As another example, the proxy device 710 may be a hardened communication gateway deployed in the DMZ network of an enterprise. To provide extra security benefits, the proxy device 710 may be able to inspect communications being proxied to enterprise resources, rather than allowing a transparent end to end communication flow between the client device 705 and the enterprise resources as if the proxy device 710 were not present. That is, the proxy device 710 may have knowledge of what resources the client device 705 is using and the protocols the client device 705 utilizes. As will be discussed in further detail in the examples below, the proxy device 710 may also provide, to the client device 705, context information that identifies one or more aspects of the authentication session between the proxy device 710 and an authentication service 715 and/or resource 720. The client device 705 may use this context information to determine whether or not to sign data provided by the proxy device 710 that requires a signature.

With reference to FIG. 8, the proxy device 710 may include a packet engine 820, which may be a hardware module and/or software module. The packet engine 820 may facilitate communications with the client device 705 and/or the resource. The proxy device 710 may also include a session cache 825. As will be described in further in the examples below, the session cache 825 may store a session key and/or ticket (e.g., for Kerberos sessions) to enable communications between the proxy device 710 and one or more resources or servers storing the resources. The proxy device 710 may include a client-side authentication module 830 configured to manage authentication with the client device 705, such as obtaining a signature from the client device 705. For Kerberos authentication, the client-side authentication module 830 may comprise a PKINIT module (which may be referred to as a likewise daemon) that implements the client side of the public key form of the Kerberos authentication protocol (e.g., a PKINIT protocol). For example, this could be the kinit command line program that is available from open source implementations of Kerberos.

The proxy device 710 may also include a library module 835 (e.g., a PKOperation Proxy SDK 835) used by the client-side authentication module 830 to abstract details for accessing the client certificate private key. For Kerberos, a PKOperation Proxy SDK 835 that implements a PKCS#11 API specification for accessing client certificates bound to smart cards may be used. The PKOperation Proxy SDK 835 may implement portions of PKCS#11 and package the relevant certificate operations into a form that can be remoted to the client device 705. By using the PKCS#11 API, the Kerberos implementation, which may comprise a standard Kerberos implementation, such as MIT, need not be modified. This makes it easier to maintain the Kerberos product, such as if security fixes are made to the product. The packet engine 820, session cache 825, client-side authentication module 830, and PKOperation Proxy SDK 835 may comprise hardware and/or software modules, and the operations that they may perform will be described in further detail in the examples below. In some aspects, the proxy device 710 may comprise one or more processor and memory storing computer-executable instructions that, when executed by the processor, cause the proxy device 710 to provide the packet engine 820, session cache 825, client-side authentication module 830, and PKOperation Proxy SDK 835 and/or to perform the operations of the packet engine 820, session cache 825, client-side authentication module 830, and PKOperation Proxy SDK 835.

The client device 705 and the proxy device 710 may communicate using a standard framework, such as an HTTP framework. In some aspects and as will be described in the examples below, the client device 705 and proxy device 710 may exchange one or more authentication messages. They may exchange HTTP status codes, such as HTTP 401 codes for requesting authentication, and/or challenge-response messages. In some embodiments, if the client device 705 which receives a 401 authentication challenge does not support secured exchange of client private certificates, the client device 705 may recognize the 401 message as an authentication challenge that the client device 705 does not understand. The client device 705 may react with the appropriate error handling behavior, such as displaying a message to the user that an operation could not be completed because the client device 705 does not support secured exchange of client private certificates. The HTTP level encoding to support public key operation remoting may be relatively simple. The Packet Engine 820 and the MAMP Framework 805 may process the HTTP level encoding. Communications may be structure similar to the HTTP Negotiate authentication scheme described in RFC 4559, which is incorporated herein by reference in its entirety. Base64 encoded blobs may be exchanged back and forth between the client device and proxy device using WWW-Authenticate and/or Authorization headers. The blobs may be generated and processed at each device by the respective PKOperation SDKs (810, 835).

In some embodiments, components in the communication path between the client device 705 and the proxy device 710 that are HTTP aware might not interface with the authentication process. For example, an HTTP proxy server between the client device 705 and the proxy device 710 may be aware that the connection to the proxy device 710 should not be reused to send requests from other client devices and/or users. Furthermore, caching of any HTTP data returned from the proxy device 710 should be correctly scoped so that the data is not sent to another client device.

In some aspects, authentication between the client device 705 and proxy device 710 may utilize a standard authentication framework, such as web authentication or Generic Security Services Application Program Interface (GSSAPI) with a custom mechanism. Objects may be transmitted from the proxy device 710 to the client device 705. The client device 705 may process the objects and validate them by standard cryptographic mechanisms, such as certificate path validation with a name check.

A specialized communication channel between the client device 705 and proxy device 710 may be created. For example, the specialized communication channel may be used to relay certificate operation requests and results. Utilizing the specialized communication channel may provide extra cryptographic protection beyond that provided by a standard SSL channel between the client device 705 and the proxy device 710. This may be appropriate given the sensitivity of the inputs and outputs of the cryptographic operations being remoted. In some examples, a Diffie-Hellman key exchange between the client device 705 and the proxy device 710 may occur. The exchange may provide mutual authentication between client device 705 and proxy device 710. In some embodiments, mutual authentication may already have been established prior to a resource access request by the client device 705. Channel binding, as described in RFC5929, which is hereby incorporated by reference in its entirety, may be used to cryptographically link the specialized communication channel to an outer SSL session. With brief reference to FIG. 8, setting up the specialized communication channel for data, such as PK operation payloads, may utilize multiple exchanges between the client device 705 and the Packet Engine 820. This may be opaque to everything except the PKOperation SDK 810 and PKOperation Proxy SDK 835.

One reason for providing extra protection via the specialized communication channel is that SSL, in practice, may be terminated by a networking device, such as an offload device, in front of the proxy device 710. Offload devices may be optimized for SSL connection processing, such as by using specialized hardware for accelerating CPU intensive operations involved in SSL connections. The hardware module may also be certified to meet commercially important cryptographic processing standards, such as the Federal Information Processing Standard (e.g., FIPS-140). Another reason for providing extra protection is that an inspection device may be given access to the SSL certificate key in order to decode communications. The inspection device may comprise a security device designed to monitor network traffic for compliance with security policies, such as by detecting attempts to send confidential information outside of a trusted network zone, or attempts to communicate with untrusted or unauthorized servers. Some of these inspection devices may be configured to impersonate other servers during SSL connection handshakes, in order to prevent the inspection process from being foiled by the use of encrypted communication channels. Using the specialized communication channel may prevent unnecessary and/or inappropriate exposure of sensitive data to the offload device and/or inspection device. Accordingly, non-repudiation properties expected from using smart card equivalent client certificates may be protected. For example, the specialized communication channel may prevent the data to be signed from being modified by external devices and/or leaks of decrypted data.

The specialized communication channel may be implemented in many ways. For example and as previously noted, a custom GSSAPI mechanism operating inside a standard HTTP authentication protocol may be utilized. This implementation provides several non-exclusive benefits. First, the proxy device 710 may indicates to the client device 705 in a standard way (e.g., HTTP) that authentication to a resource and/or authentication server is required to complete the requested resource access. Second, an arbitrary binary protocol may be conducted between the client device 705 and the proxy device 710, with multiple rounds if necessary. Third, the implementation allows for secure communication mechanisms to be negotiated and applied to transfer data in a standard way (e.g., at the GSSAPI level). In some implementations, the custom GSSAPI mechanism operating inside a standard HTTP authentication protocol can also allow for a platform implementation of GSSAPI to be used with a custom mechanism being added, such as the MICROSOFT NegoEx mechanism.

Referring to FIG. 7, one or more authentication service 715 (or server running the authentication service 715) may exist. Authentication service 715 may implement one or more types of authentication, including Kerberos or SSL. The aspects described herein may be implemented for any authentication protocol that involves client certificate private key operations. For example, for Kerberos, the authentication server may be tasked with issuing tickets, including ticket granting tickets and/or session tickets. The authentication server may communicate with the proxy device 710 over one or more channels. Furthermore, the one or more channels may use a communication protocol different from the communication protocol used by the client device 705 to communicate with the proxy device 710. In some aspects, the authentication services 715 might remain unchanged, even with implementation of the aspects described herein. In other words, the authentication services 715 may exist in a traditional infrastructure. The authentication services 715 may include, for example, the authentication services 558 noted above.

One or more resources 720 (or servers storing the resources 720) may exist. The resource 720 may communicate with the proxy device 710 using one or more of the same or different protocols as the authentication server uses to communicate with the proxy device 710. In some aspects, the resources might remain unchanged, even with implementation of the aspects described herein. In other words, the resources may exist in a traditional infrastructure. Non-limiting examples of resources may include, but are not limited to, file resources, web resources, mail resources, Sharepoint resources, and the like. These resources may include Structure Query Language (SQL) databases, remote procedure call (RPC) servers, Distributed Component Object Module (DCOM) servers, Simple Object Access Protocol (SOAP) web services, Representational State Transfer (REST) web services, and other proprietary resources that may use GSSAPI or a similar security framework for authentication. One or more of these resources may be directly accessed by internal devices, such as computers on the same network as the resources or in another protected network. The resources may comprise the enterprise resources 504, 508, and/or 608 and/or the enterprise services 508 and/or 609 noted above. Furthermore, the resources may be stored on one or more servers, such as servers 206 illustrated in FIG. 2. The resources may be accessed through a multi-tier system. The proxy device 710 may communicate with a front-end server that may in turn communicate (and authenticate as a requesting user) with a backend server. Kerberos with unconstrained delegation may be used for this type of system, and the proxy device 710 may supply a forwarded TGT for the user to the front-end server.

Figure 9A:
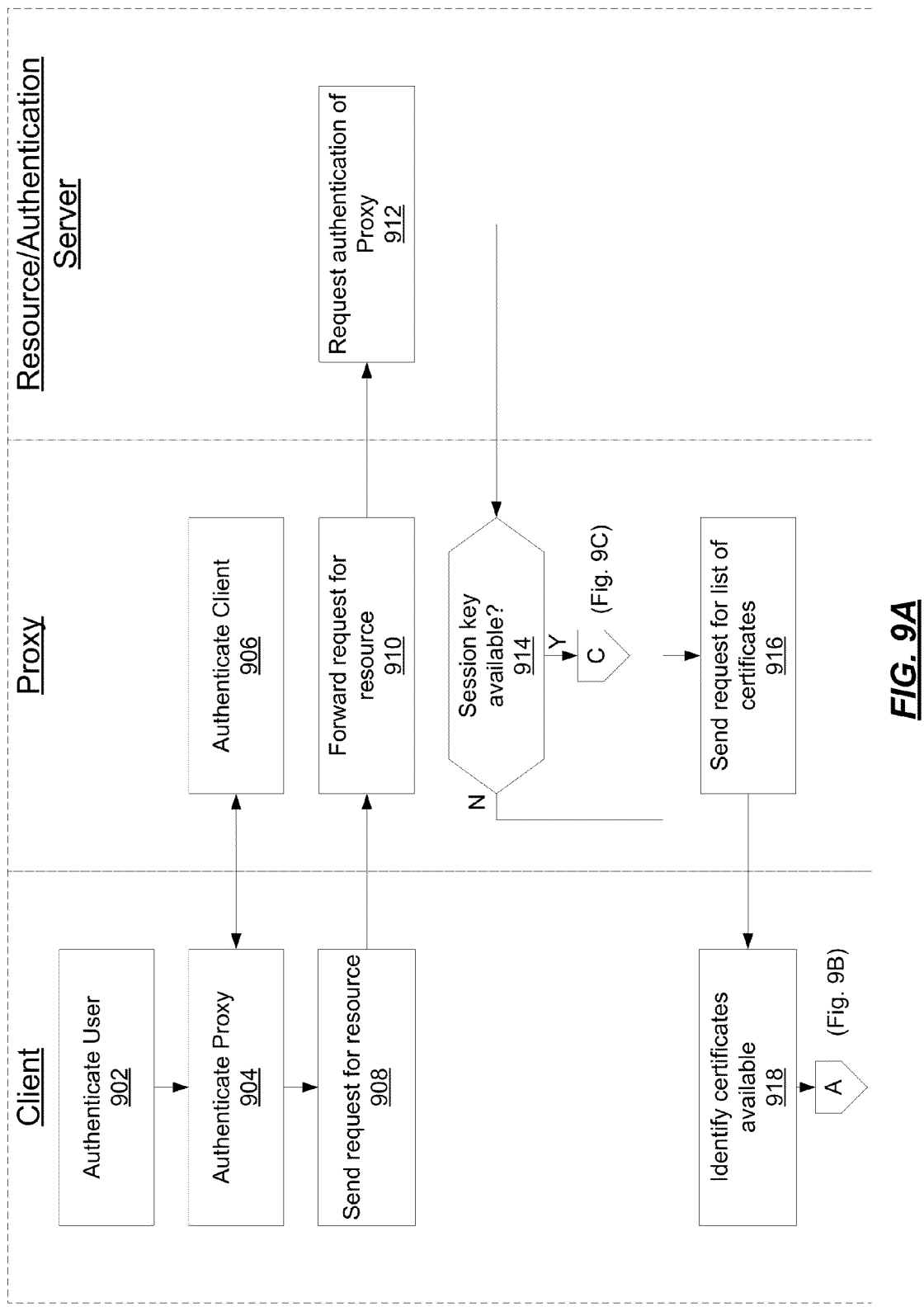
FIG. 9A is a flowchart of example method steps for authentication and/or providing secured access to resources using a proxy.
Figure 9B:
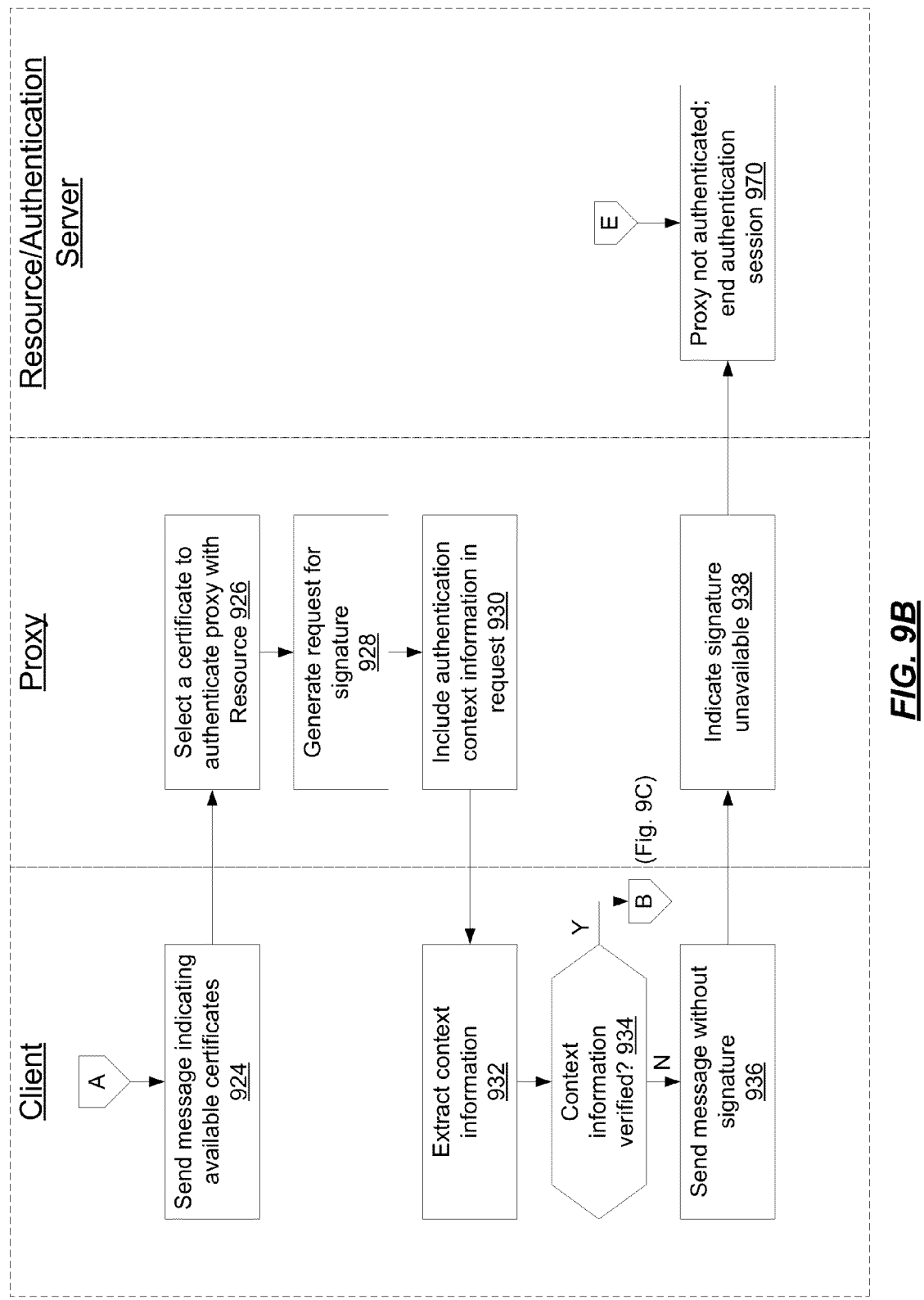
FIG. 9B is a flowchart of additional example method steps for authentication and/or providing secured access to resources using a proxy.
Figure 9C:
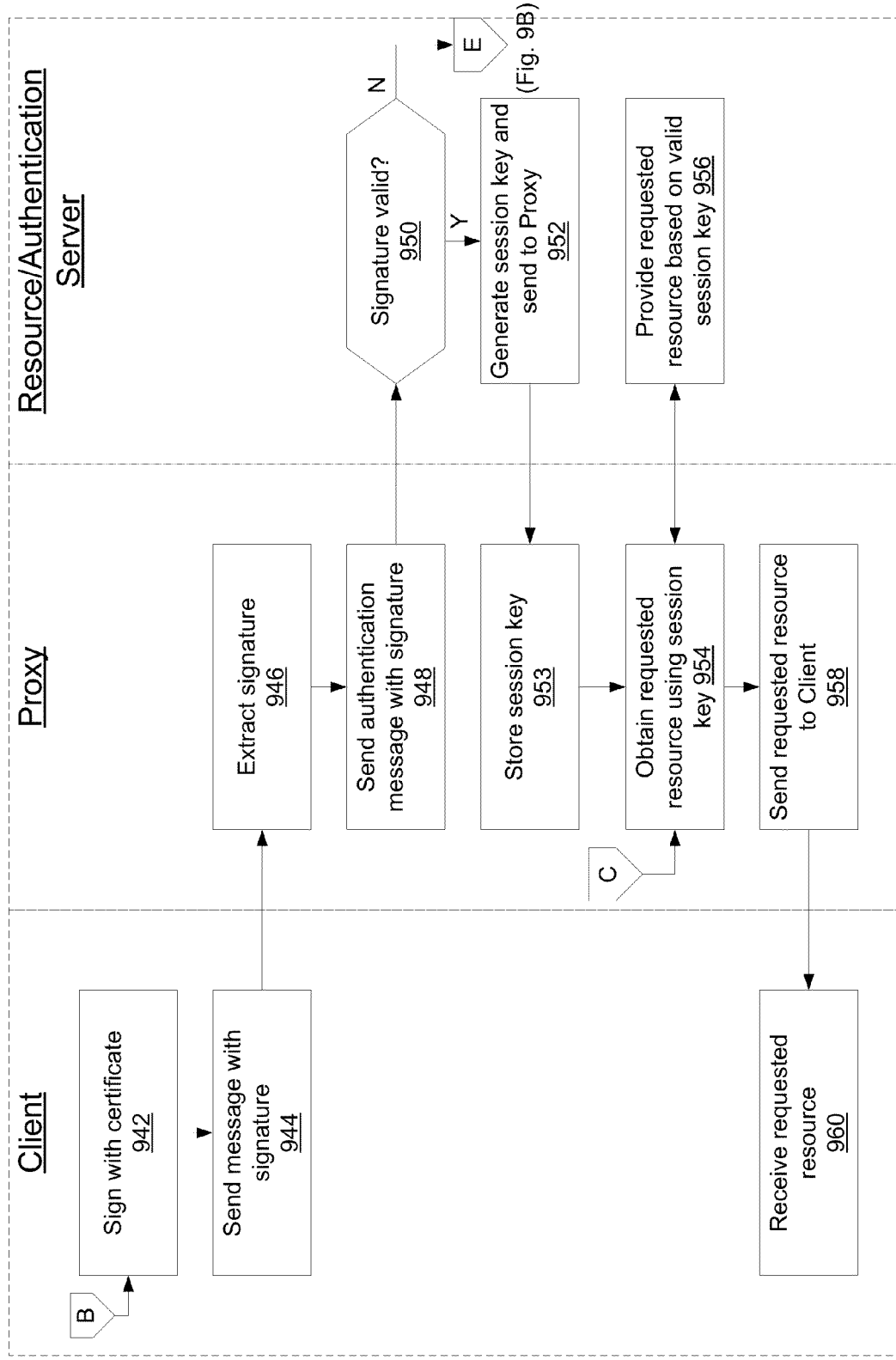
FIG. 9C is a flowchart of yet additional example method steps for authentication and/or providing secured access to resources using a proxy.

FIGS. 9A-C are flowcharts of example method steps for authentication and/or providing secured access to resources using a proxy. FIGS. 9A-C illustrate each step being performed by one of the client device 705, proxy device 710, authentication service(s) 715, and/or resource(s) 720. However, the method steps may be performed by any of the client device 705, proxy device 710, authentication service(s) 715, resource(s) 720, and/or a combination thereof. As previously noted, the resources 720 and authentication services 715 may be provided by the same server (or group of servers). Alternatively, the resources 720 and authentication services 715 may be provided by different servers (or group of servers). For simplicity, some of the method steps are illustrated in FIGS. 9A-C as being performed by a single resource/authentication service entity (e.g., a server or group of servers). However, the authentication services may be provided by an authentication server (or groups of authentication servers) and the resources may be provided by a different server (or group of servers).

In step 902, the user may be authenticated with the client device 705. For example, the user may provide credentials, such as a username and/or password, to login to the client device 705.

In step 904, the client device 705 may authenticate the proxy device 710. Additionally or alternatively, in step 906, the proxy device 710 may authenticate the client device 705. In other words, the client device 705 and proxy device may perform mutual authentication. To perform the authentication, the client device 705 may connect to the proxy device 710 using SSL with server authentication. The proxy device 710 may request the client device 705 and/or the user of the client device 705 to authenticate to the proxy device 710 before authorizing access to the proxy device 710. In some aspects, the client device 705 may use an enterprise client certificate for this authentication. The enterprise client certificate may be the same certificate used by the client device 705 to sign documents and/or authentication messages, as will be described in further detail in the examples below. Alternatively, the enterprise client certificate may comprise a different certificate. For example, the client device 705 may have multiple certificates, each used for a different purpose. If a physical smart card is used, the multiple certificates may be stored on the smart card or different smart cards.

Similarly, the client device 705 may request authentication of the proxy device 710 to establish that the proxy device 710 is a known trusted entity and may request identification of resources to which the user is being authenticated by means of delegated authentication through the proxy. The client device 705 may also authenticate the user of the client device 705 to the proxy device 710, for instance using the client certificate available to the device as part of the SSL handshake, or by running a separate user authentication protocol inside the SSL connection, for instance over HTTP. Resources 720 may also wish to know that access to the resources 720 is being mediated by the proxy device 710, such as by using a resource access protocol. Thus, mutual authentication or identification may be performed for all three entities, the client device 705/user, the proxy device 710, and the resources 720.

After authentication and/or identification of one or more of the three entities, the client device 705 may send a request to the proxy device 710 for one or more resources, such as web resources, enterprise resources (e.g., from a network file server), or other resources, that can be accessed by the proxy device 710 but that may require user authentication based on a client certificate. The request for a resource may be sent by the client device 705 over HTTP, HTTPS, or any other access protocol supported by the client device. The proxy device 710 may translate or bridge from the access protocol used by the client device 705 (e.g., HTTP or HTTPS) to the access protocol used by the resource. After translation, the proxy device 710 may forward the request to the resource and/or authentication service in step 910 or otherwise attempt to access the requested resource.

In step 912, the resource may request authentication from the proxy device 710. For example, the resource may indicate the type of authentication to be performed (e.g., SSL, a domain-based authentication, such as Kerberos, etc.). Based on the type of authentication, the resource may send an authentication challenge (e.g., a 401 Negotiate message for Kerberos authentication or a client certificate challenge for SSL authentication). For Kerberos authentication, a PKINIT protocol may be used, and the proxy device 710 may perform the role of the client in the PKINIT protocol to authenticate the user identified by the client certificate to the Kerberos realm (e.g., a MICROSOFT Active Directory domain). The resource server may generate a Kerberos authentication challenge, such as HTTP 401 Negotiate. For SSL authentication (e.g., using a client certificate), the proxy device 710 may represent to the resource that the proxy device 710 has access to the user's client certificate and/or key. The proxy device 710 may attempt to authenticate directly with the resource instead of with a particular domain, as in Kerberos authentication. Additionally or alternatively, the proxy device 710 may be aware that authentication is required before attempting to access the requested resource. In either case, the proxy may determine and initiate the relevant authentication protocol interactions with the resource. These interactions may involve additional entities such as an authentication server running an authentication service trusted by the resource.

In step 914, the proxy device 710 may determine whether a session key that can be used to initiate a secured communication session with the resource (or a server having the resource) is available. A session key may have previously been obtained by the proxy device 710 based on a prior authentication session with the resource or authentication service and stored (e.g., cached) at the proxy device. For Kerberos authentication, the session key may be stored with a Kerberos ticket, such as a ticket granting ticket (TGT) or other time-limited ticket. With reference to FIG. 8 and for Kerberos authentication, the Packet Engine 820 of the proxy device 710 may invoke its Kerberos authentication response logic, which checks to see if there is already a service ticket for the resource (e.g., a web resource) in the session cache 825. In some aspects, the client-side authentication module 830, in response to the check, may invoke PKINIT if the proxy device 710 knows that client certificate authentication is required and/or supported. For SSL authentication, the session key may be used to resume a previous SSL connection, such an SSL session. If a session key (and/or ticket) is available (step 914: Y), the proxy device 710 may continue to step 954 (obtain requested resource) using the session key (and/or ticket), as will be described in further detail in the examples below.

For a first time authentication, the session cache may be empty (e.g., not store a valid session key and/or ticket) (step 914: N). Thus, the proxy device 710 may initiate authentication with the resource. With reference to FIG. 8 and for Kerberos authentication, the Packet engine 820 may issue an internal PKINIT command to the client-side authentication module to obtain a TGT. In order to authenticate, the proxy device 710 may determine that it needs one or more client certificates and/or signatures based on a client certificate accessible by the client device 705. These certificates and/or signatures might not be directly accessible by the proxy device 710. With reference to FIG. 8, the client-side authentication module 830 may send a command, such as an internal P11 get certificates command, to PKOperation Proxy SDK 835 to obtain certificates from the client device 705. The client-side authentication module 830 may incorporate a Kerberos client implementation, which supports a public-key cryptography standard (PKCS), such as the standard PKCS#11 library interface as a way to look for suitable client certificates for PKINIT. The PKOperation Proxy SDK 835 may implement the relevant subset of the PKCS#11 API functions to support the PKINIT feature.

In step 916, the proxy device 710 may send the request to the client device 705 for a list of certificates available and/or accessible to the client device 705. The request may be encoded into an HTTP header. For example, the request may be encoded in a 401 status code in HTTP indicating that an authentication is required and challenging the client device 705 for authentication. With reference to FIG. 8, the Proxy SDK 835 may require a custom interface to the Packet Engine 820 which the Proxy SDK 835 may use to have certificate requests (e.g., PK operation requests) sent to the client device 705 and to receive the results if the client device 705 responds to the request. If the certificate requests need to be remoted, the Proxy SDK 835 may encode the request into a binary structure (having encryption/integrity wrappers as appropriate), and submit to the Packet Engine 820. The Packet Engine 820 may causes an HTTP 401 response with a custom authentication challenge to be sent to the client device 705 in response to the initial HTTP request, containing the binary structure encoded in a WWW-Authentication header.

In some aspects, the proxy device 710 might not receive a response responsive to the request for a list of certificates from the client device 705. In particular, there is no guarantee that the client device 705 will respond to the certificate (e.g., PK operation) request. For example, the client device 705 may have crashed or otherwise been unable to respond to the request. Furthermore, the client device 705 may have attempted to obtain user consent for the operation (e.g., by requesting the user to enter a PIN to unlock the keystore 815), but consent might be denied. To handle situations where the client device 705 does not return a list of client certificates, the proxy device 710 (such as the Proxy SDK 835 component) may use a timeout to eventually abandon the certificate request operation. The proxy device 710 may return a suitable error code in these circumstances. During PKINIT logon, several PK operations may be sent to the device, until the PKINIT logon succeeds, fails or is abandoned or the timeout lapses.

In step 918, the client device 705 may receive the certificate list request from the proxy device 710 and, in response, identify the certificates available or otherwise accessible to the client device 705. For example and with reference to FIG. 8, the MAMP framework 805 of the client device 705 may receive the message (e.g., an HTTP 401 request) having a custom authentication challenge from the proxy device 710. Recognizing it as a certificate request (e.g., a PK operation 'authentication' protocol), the MAMP framework 805 may decode the message from the received header format and pass a binary structure of the message to the PKOperation SDK 810. The PKOperation SDK 810 may have knowledge of the available client certificate(s). As previously noted, the client certificates may be in the form of a physical smart card, a virtual smart card, and the like. The PKOperation SDK 810 may decode the request (including processing any encryption/integrity wrappers), and dispatch it to an appropriate internal handler. The handler may process the request and generate a list of available certificates. The list of certificates may be filtered according to relevance for the operation being requested, for example, to only include certificates with an appropriate key usage indicator. The list of certificates may be filtered until only one certificate remains. For example, the list may be further filtered by presenting a UI to the user of the client device 705 to pick the certificate that should be used for the operation. The list may be in a binary structure that represents the operation result. The PKOperation SDK 810 may return the list of certificates, which may still be in the binary structure, to the MAMP framework 805 or signal an error condition if the list cannot be generated.

With reference to FIG. 9B, in step 924, the client device 705 may send a message including the list of available certificates to the proxy device 710. In some aspects, the message may be sent as an HTTP or HTTPS message. For example, the MAMP framework 805 may replay the original HTTP request from the proxy device, but use a custom Authorization header attached to the request which includes the list of available certificates. Prior to sending, the message may be sealed in the encryption/integrity wrapper and/or encoded to fit an HTTP header.

In step 926, the proxy device 710 may receive the message from the client device 705 (and decrypt/decode if necessary). With reference to FIG. 8, the Packet Engine 820 may recognize that the HTTP request received from the client device 705 is a resend of the original certificate request sent by the proxy device 810. The Packet Engine 820 may submit a binary structure of data from the Authorization header to the Proxy SDK 835 via the client-side authentication module 830. The Proxy SDK 835 may unpack the binary structure (including the encryption/integrity wrapper) and return the unpacked data to the client-side authentication module 830. Next, the proxy device 710 may select a certificate (from the list of certificates) to use to authenticate the proxy device 710 with the resource/authentication server, such as a certificate that is suitable for the authentication session (i.e., to authenticate the proxy device 710 with the resource/authentication server). In some embodiments, the Kerberos and SSL standards may specify the key usage(s) that are expected or required. For example, if the authentication session comprises Kerberos authentication, the proxy device 710 may need to obtain Kerberos tickets and can select the certificate suitable to obtain Kerberos tickets. If the client device 705 returned multiple certificates in step 924, the proxy device 710 may send a selection request to the client device seeking user input to select from a list of certificates.

The proxy device 710 and resource may continue exchanging messages during the authentication session. At one or more points during the authentication session, the proxy device 710 may be required to perform a cryptographic operation with a signature, such as a private key, of the client device 705. The private key might not be directly available to the proxy device 710. Instead, the private key may remain under the control of the client device 705 and not exposed directly to the proxy device 710. The proxy device 710 may interact with the client device 705 over a specialized communication channel to obtain a signature (e.g., the private key).

In step 928, the proxy device 710 may generate a request for a signature corresponding to the selected certificate from the client device 705. The proxy device 710 may also generate a piece of data to be signed. For Kerberos authentication, the piece of data may comprise an authentication service request (AS_REQ) message using the selected certificate. The AS_REQ message may optionally be included with the request for signature to be sent to the client device 705. The proxy device 710 may send an unsigned AS_REQ message to the client device 705 if the client device needs to ascertain the full details of the authentication context before providing a signature. The proxy device 710 might not send the AS_REQ message to the client device 705 if the communication protocol between the client and proxy devices and/or the Kerberos authentication implementation do not support sending the AS_REQ message to the client device 705. As will be discussed in the examples below, the proxy device 710 may send a signed AS_REQ message to the authentication service 715 and/or resource 720 for authentication once it has been signed by the client device 705.

In step 930, the proxy device 710 may determine authentication context information to be included in the request for signature. In some aspects, the context information might not be limited by size or format. For example, the proxy device 710 may send the context information as a Binary Large Object (BLOB). Generally, the context information may comprise information that identifies the authentication session between the proxy device 710 and the resource/authentication server. As will be described in further detail in the examples below, the client device 705 may use the context information to verify or otherwise confirm the authentication session between the proxy device 710 and the resource/authentication server.

Examples of the content of the context information will now be provided. The context information may identify a data structure of authentication information previously exchanged between the proxy device 710 and the resource/authentication server. For example, if the proxy device 710 and the resource have already exchanged authentication messages and are currently in the middle of authentication, the context information may comprise all or a portion of the exchanged authentication messages. Additionally or alternatively, the context information may identify a data structure of authentication information to be sent by the proxy device 710 to the resource/authentication server in the future. In Kerberos authentication, for example, the context information may comprise part or the entire AS_REQ message to be sent by the proxy device 710 to the resource/authentication server.

The context information may comprise timestamp information associated with the authentication session. The timestamp may identify the current time as determined by the proxy device 710. For Kerberos/PKINIT, the authentication service 715 and/or resource 720 may validate the timestamp during authentication. In general, the timestamp should be within a reasonably tight tolerance of the current time (e.g., within X seconds) determined by the authentication service 715 and/or resource 720. Because the timestamp is used to authenticate the proxy device 710 with the authentication service 715 and/or resource 720, the timestamp may also be used for verification by the client device 705. A greater tolerance threshold (e.g., X+Y seconds) may be used by the client device 705 because the client device 705 and the proxy device 710 might not be as closely synchronized in time as the proxy device 710 and the authentication service 715. The client device 705 may use the timestamp information to verify that the authentication session is recent (e.g., within the last minute, within the last day, etc.).

The context information may identify the type of authentication protocol being used by the proxy device 710 and resource/authentication server. For example, if Kerberos authentication is used, the context information may identify Kerberos generally or PKINIT/Kerberos if the PKINIT features of Kerberos are being used. As one example, "sign-for-PKINIT" may be used. The context information may also identify the application requesting the signature or the specific proxy device 710 implementation. For example, 'sign-for-PKINIT-by-NetScaler' or 'sign-for-PKINIT-by-XenApp' may be used. If SSL authentication is used, the context information may identify SSL. As one example, 'sign-for-SSL-client-authentication' may be used. The context information may also identify which SSL authentication operation the proxy device 710 is performing (e.g., operation 1, operation 2, etc.) and with which resource the proxy device 710 is authenticating.

The context information may identify the certificate that the proxy device 710 selected from the list of certificates provided by the client device 705 (e.g., step 926). By providing the selected certificate, the client device 705 may be able to figure out the type of authentication protocol being used by the proxy device 710 and the resource.

The context information may identify the data structure of the authentication session, such as a Kerberos data structure or an SSL data structure. For example, the Kerberos authentication session may comprise Abstract Syntax Notation 1 (ASN.1) constructs, which the proxy device 710 may identify via the context information. In particular, an AuthPack, which may be part of the AS_REQ, to be signed may have a well-defined ASN.1 structure that the client device 705 may recognize. For SSL authentication, the data structure may comprise a CertificateVerify structure.

The context information may comprise specific pieces of information that the client device 705 may use to verify the authentication session. The specific pieces of information can also be used to identify the data structure of the authentication session. For example, if the authentication session comprises Kerberos authentication, the context information may include, for example, a checksum associated with the Kerberos authentication, a Kerberos domain used for the Kerberos authentication (e.g., the realm that a particular authentication server serves), a Kerberos principal name associated with the client device 705 (e.g., a username assigned to the client device 705), an identifier of a key distribution center (KDC) used for the authentication session, a validity period of a requested ticket (e.g., a TGT ticket or session ticket), and Kerberos flags that have been set during the authentication session (e.g., based on the authentication messages so far exchanged between the proxy device 710 and resource/authentication server). An example flag that the client device 705 may verify is a "forwardable" flag, which may indicate that the resulting ticket may be forwarded to another device. As previously noted, a portion or the entirety of an AS_REQ message to be signed by the client device 705 and to be sent to the resource/authentication server may be sent to the client device 705.

For SSL authentication, specific pieces of information alone might not be sufficient for the client device 705 to identify the context of the SSL authentication session between the proxy device 710 and the resource/authentication service. For example, the specific pieces of information will look like random data to the client device 705 because SSL authentication creates hashes of an entire series of packets that have gone back and forth between proxy device 710 and the resource. Thus, in some embodiments, the context information for SSL authentication may comprise the entire (or close to entire) authentication conversation between the proxy device 710 and the resource prior to requesting the signature from the client device 705. In other words, all of the SSL operations (e.g., handshake messages) may be provided to the client device 705. The proxy device 710 generates a cumulative digest of SSL operations performed. Accordingly, the client device 705 may inspect any portion of the handshake that the client device 705 wishes to inspect, allowing the client device 705 to ascertain the identity of the resource being accessed and to confirm that the handshake is well-formed. In some aspects, the proxy device 710 may delegate the entire SSL handshake process to the client device 705 over a certificate operation interface. When the handshake is complete, the client device 705 may supply a Master Secret protected under the key exchange for the specialized communication channel between the client and proxy.

In step 932, the client device 705 may receive the request for signature from the proxy device 710 and extract the context information included therein. For example, the client device 705 may decode and/or decrypt the request message. Examples of the context information were previously listed. In step 934, the client device 705 may attempt to verify the context information. The client device 705 may use the context information to verify that the authentication session between the proxy device 710 and the resource/authentication server is valid. For example, the client device 705 may use the context information to determine that the proxy device 710 is communicating with the resource/authentication server and the type of communication occurring between them. The client device 705 may be made aware of a relevant portion (or entirety) of the resource authentication protocol or the proxy's authentication context, sufficient for the client device 705 to satisfy itself that, for example, the resource being accessed is the intended one, the cryptographic operation being requested is part of the expected protocol, and the results of the cryptographic operation will be or can only be usefully used as part of the specific protocol interaction between the proxy device 710 and resource. For instance, the client device 705 may inspect the data (e.g., an AS_REQ message for Kerberos authentication) the client device 705 has been asked to sign to ensure that the data (or appended data) corresponds to a well-known structure used by that construct of the expected authentication protocol (e.g., Kerberos, SSL, etc.). The data may also potentially include specific data elements that can be verified by the client device 705. Alternatively or additionally, the client device 705 may look for a recognizable and/or verifiable expected structure in the data before the client device 705 provides a signature.

If the context information is not verified (step 934: N), the client device 705 may send a message indicating that the context information could not be verified. For example, the client device 705 may send a response that does not include the requested signature. For Kerberos authentication, the verification may fail if the timestamp is outside the tolerance threshold set by the client device 705. For SSL and Kerberos authentication, the client device 705 may perform certificate chain validation on the authentication/resource server certificate, which may fail for any of a number of reasons. Certificate chain validation for Kerberos may require a separate PK operation step (dealing with AS_REP, which is the reply to AS_REQ). For SSL, the chain validation may be possible if the relevant portion of the SSL authentication messages between proxy device 710 and resource are sent to the client device 705.

In some aspects, the client device 705 may request additional context information from the proxy device 710 if the client device 705 cannot verify based on the context information already provided by the proxy device 710. If the proxy device 710 decides to provide the additional context information, the proxy device 710 may return to step 930 and find additional context information to provide to the client device. The additional context information may be of a different type of context information. For example, if the proxy device 710 previously provided information identifying the certificate that the proxy device 710 selected, the proxy device 710 may provide specific information from the authentication messages exchanged between the proxy device 710 and the resource/authentication server (e.g., the Kerberos flags set during a Kerberos authentication session or handshake messages exchanged during an SSL authentication session). Instead of sending a message without a signature, the client device 705 might not respond to the proxy device's signature request.

In step 938, the proxy device 710 may generate a message indicating that a signature is unavailable and forward the message to the resource/authentication server. In step 970, the resource/authentication server may determine that the proxy has not been authenticated, and in response, may end the authentication session. In other words, the resource/authentication server might not provide the Proxy with a session key (or a ticket in the case of Kerberos).

The context information may be verified (step 934: Y). For Kerberos authentication, verification may succeed if, for example, the received timestamp is within a tolerance of the current time at the client device and/or if the checksum in received AuthPack matches the checksum computed by the client device (in the case where AS_REQ is supplied as context information). If the context information is verified, in step 942, the client device 705 may sign the data provided by the proxy device 710 using the certificate, which may have been selected by the proxy device 710 in step 926. For example, for Kerberos authentication, if the proxy device 710 provided the unsigned AS_REQ message to the client device 705 (e.g., in step 930), the client device 705 may sign the AS_REQ message. As previously noted, providing the unsigned AS_REQ is optional. As an alternative, for both Kerberos and SSL authentication, the data provided by the proxy device 710 may comprise any chunk of data, such as a sequence of octets, on which the signature is to be computed. After signing the data, the client device 705 may send a message with the signature and/or the signed data to the proxy device 710 in step 944.

In step 946, the proxy device 710 may receive the message and extract the signature and/or signed data. For example, the signature (which may be another sequence of octets) may be returned to the proxy device and inserted by the proxy device into the appropriate authentication message to be sent to the resource or authentication service, as will be discussed in further detail below. With reference to FIG. 8, the Packet Engine 820 may receive the message and forward the message to the Proxy SDK 835. The Proxy SDK 835 may provide the signature to the client-side authentication module 830.

In step 948, the proxy device 710 may send an authentication message including the signature to the resource/authentication server. The authentication message may be in response to the request to authenticate sent by the resource/authentication server in step 912. In general, the authentication message may be used to obtain a session key for the proxy device 710 to obtain resources requested by the client device 705. In Kerberos authentication, for example, the authentication message may comprise an AS_REQ message used to obtain a session key and a ticket, such as a TGT, which the proxy device 710 may use to obtain tickets for a secured communication session with the resource. If the proxy device 710 received a signed AS_REQ message from the client device 705, the proxy device 710 may forward the signed AS_REQ message to the resource/authentication server. If the proxy device 710 received the signature separately, the proxy device 710 may generate an AS_REQ message and append the signature to the AS_REQ message. In some aspects, the AS_REQ message may be encoded in the PA-PK-AS-REQ format, as described in RFC 4556, which is herein incorporated by reference in its entirety.

In step 950, the resource/authentication server may receive the authentication message and determine whether the authentication message has a valid signature. If the signature is not valid, the resource/authentication server may perform step 970, which was previously discussed (e.g., determine that the proxy device 710 is not authentication and/or end the authentication session with the proxy device 710).

In step 952, if the signature is valid (step 950: Y), the resource/authentication server may generate and/or send a session key to the proxy device 710. In Kerberos authentication, the resource/authentication server may also send a ticket, such as a TGT or a service ticket, to the proxy device 710. The session key and/or ticket may be encapsulated using another key that the proxy device 710 and/or the client device 705 can decrypt. In some aspects, the message may be sent as a Kerberos AS_REP message.

In step 953, the proxy device 710 may receive the session key and/or ticket and store (e.g., cache) the session key and/or ticket. They may be cached for later use. For example, the session key and/or ticket may be used in the future if the client device 705 requests additional resources. With reference to FIG. 9A, the proxy device 710 may determine that a session key is available in step 914 the next time the proxy device 710 needs to obtain a resource for the client device 705. With reference to FIG. 8 and for Kerberos authentication, the client-side authentication module 830 may populate a Kerberos ticket cache for user sessions with TGTs and/or service tickets and their corresponding session keys.

In some embodiments, the proxy device 710 might not have the key to decrypt the message having the session key and/or ticket received from the resource/authentication server. Instead, the client device 705 may control access to the key, for example, if the client device 705 does not entirely trust the proxy device 710. In these embodiments, the proxy device 710 and the client device 705 may optionally exchange an additional set of messages (e.g., in an additional certificate operation) to decrypt the encapsulated message comprising the session key and/or ticket. The exchange may occur instead of the proxy device 710 decrypting and storing the session key and/or ticket in step 953.

For example, in Kerberos authentication, PKINIT may use Diffie-Hellman key exchange to negotiate an AS reply key for wrapping the TGT session key, as described in section 3.2.3.1 in RFC 4556, which is incorporated by reference in its entirety. Alternatively, public key encryption may be utilized by a KDC to encrypt an AS reply key it generates with the certificate's public RSA key, as described in section 3.2.3.2 in RFC 4556. This may force the proxy device 710 to request the client device 705 to decrypt the reply key. In these examples, the client device 705 may choose to retain the reply key and other keys it protects such as the TGT session key allowing it to control any use of the TGT to request further tickets (and to control use of those service tickets as well if it wished). Thus, instead of the proxy device 710 storing the session key and/or ticket in step 953, the client device 705 may store the session key and/or ticket. This may be appropriate if the client device 705 has a moderate trust in the proxy device 710, but not entire trust.

Further details on using public key encryption will now be described. If RSA public key encryption is used to return the AS reply key, the proxy device 710 may request certificate private key decryption from the client device 705 of a substructure in a data field of the reply message with the session key and/or ticket received from the resource, such as an encKeyPack field of a KRB-AS-REP reply message. A blob which results from decryption by the client device 705 may be a SignedData structure, as defined in section 5.1 of RFC 3852, which is incorporated herein by reference in its entirety. The SignedData struct may have content type id-pkinit-rkeyData and a content field containing a ReplyKeyPack structure as defined in section 3.2.3.2 of RFC4556. The signature field on SignedData may include the KDC's certificate allowing the client device 705 to perform certificate path validation to confirm the identity of the KDC. Accordingly, if RSA public key exchange is used, the client device 705 may have the ability to fully verify the identity of the KDC to which the proxy device 710 is authenticating. If Diffie-Hellman key exchange is used, the proxy device 710 may see the KDC's certificate and perform path validation. The proxy device 710 may not need to involve the client device 705 in completing the key exchange.

Alternatively, the client device 705 may have high trust in the proxy device 710 and allow the proxy device 710 to decrypt the message containing the session key and/or ticket. In these embodiments, the proxy device may decrypt the message and store the session key and/or ticket as previously described with respect to step 953. For example, the proxy device 710 may control the Diffie-Hellman key exchange, allowing the proxy device 710 to recover the session key (e.g., associated with a TGT) without further client device 705 support. In this case, the proxy device 710 may be granted unconstrained delegation permissions by the client device 705 as the proxy device 710 can exercise full control of the TGT.

Additionally or alternatively, the proxy device may utilize the Microsoft Active Directory environment to obtain the session key and/or ticket. In a Microsoft Active Directory environment, the proxy device 710 may support an extension of the PKINIT process that allows the proxy device 710 to receive the user's password hash (such as NTLM credentials) from the domain controller. This allows the proxy device 710 to respond to NTLM authentication challenges as well as Kerberos authentication challenges. Unless the client device retains the AS reply key in order to retain control over the TGT session key (as previously described), no additional interaction between the proxy device 710 and the client device 705 may be required to recover the NTLM password hash because it may be encrypted with the same AS reply key used to convey the TGT session key.

In step 954, the proxy device 710 may obtain the requested resource using the session key. In step 956, a server or other database may provide the requested resource based on the session key. For Kerberos authentication, the resource/authentication server may have provided a TGT and an associated session key in step 952. In this example, the proxy device 710 may perform inline authentication on behalf of the user of the client device 705 by obtaining additional Kerberos service tickets for requested resources using the TGT. With reference to FIG. 8, the client-side authentication module 830 may signal the Packet Engine 820 if PKINIT and Kerberos ticket fetching succeeded to retry the proxied HTTP request to the resource. This may be performed when the session key/ticket cache is populated. The Packet Engine 820 may attach an Authorization header containing the appropriate Kerberos binary structure (AP_REQ) generated from the service ticket and session key to obtain the resource. As previously noted, the client device 705 might not entirely trust the proxy device 710. In these examples, the client device 705 may retain possession of the TGT session key and may require the proxy device 710 to interact with the client device 705 when requesting service tickets for individual resources. In this way, the client device 705 can ensure visibility of the identity of resources being accessed on its behalf by the proxy device 710.

In step 958, once the proxy device 710 obtains the resource, the proxy device 710 may send the resource to the client device 705. In step 960, the client device 705 may receive the requested resource and use it as desired, such as by accessing data or services, such as enterprise data or services. As previously discussed, the data or services may be encrypted in data vaults 616 to protect the data or services on the client device 705.

In some embodiments, the client device 705 may communicate with the resource 720, such as Sharepoint, using a VPN tunnel (e.g., through the proxy device 710) or other type of communication channel. Instead of the proxy device 710 receiving the resource authentication challenge from the resource 720 (e.g., in step 914 illustrated in FIG. 9A), the client device 705 may receive the challenge via the VPN tunnel. The client device 705 may establish a second parallel conversation with the proxy device 710 (or communicate with the proxy device over a previously established channel) to enable the proxy device 710 to aid in authentication. This is beneficial because the client device 705 might not have the functionalities to perform certain types of authentication, such as Kerberos authentication. During the second parallel conversation, the client device 705 may present the resource authentication challenge to the proxy device 710. The proxy device 710 may then communicate with the authentication service 715 (e.g., a KDC in the case of Kerberos authentication) and obtain a session key (and Kerberos ticket in the case of Kerberos authentication) needed for the client device 705 to access the resource. At this point, the steps performed among the client device 705, proxy device 710, and authentication service 715 may include, for example, any of steps 914, 916, 918, 924, 926, 928, 930, 932, 934, 936, 938, 970, 942, 944, 946, 948, 950, 952, and/or 953 previously discussed in reference to FIGS. 9A-C. After the proxy device 710 receives the session key and/or ticket from the authentication service 715, the proxy device 710 may return the key and/or ticket to the client device 705 over the secure communication channel between the client device and the proxy device. The client device 705 may now respond to the resource authentication challenge received from the resource 720 using the session key and/or ticket and obtain the requested resource. Alternatively, instead of the proxy device 710 returning the key and/or ticket to the client device 705, the proxy device 710 may itself construct the response to the resource authentication challenge and send the authentication response to the client device 705. The client device 705 may forward the response to the resource 720 to obtain the requested resource.

The steps illustrated in FIGS. 9A-C may be applied to signing documents, such as emails or other document types, and/or to decrypting data that is protected by the certificate private key. In the example of signing documents, the proxy device 710 may provide the client device 705 with the document to be signed as the context information described herein.

The steps illustrated in FIGS. 9A-C may also be applied to a virtualization environment, such as desktop and/or application virtualization. In a virtualization environment, the client device 705 may be running a virtualization application, such as the client agent 604 illustrated in FIG. 6 or any other client application used to establish a remote display connection (e.g., CITRIX ICA, CITRIX RDP, etc.). As previously noted, the client device 705 may still secure a private certificate, such as a key stored in a physical or virtual smart card.

The proxy device 710 may comprise or be part of an application or desktop virtualization server, such as virtualization server 301 illustrated in FIG. 3. Such servers may run applications and may communicate with resources, such as enterprise resources. Communications between the proxy device 710 and the client device 705 in a virtualization environment may be handled over a display remoting protocol, such as CITRIX ICA protocol or CITRIX RDP protocol. The resource may comprise the enterprise resources 504, 508, and/or 608 and/or the enterprise services 508 and/or 609 noted above.

In some embodiments, the steps illustrated in FIGS. 9A-C may be used for virtualization environments. Alternatively, some changes may be made. HTTP communications between the client device 705 and the proxy device 710 may be replaced with communications utilizing a display remoting protocol, such as CITRIX ICA protocol or CITRIX RDP protocol. The PKOp Proxy SDK 835 may comprise a third party application. Accordingly, steps performed by the PKOperation Proxy SDK 835 described above may be performed by a third party application. In some aspects, the proxy device 710 may call out to the third party application to perform these steps.

An example virtualization embodiment will now be described. A standard OS Kerberos implementation where the virtualization server runs an OS, such as Microsoft Windows, may be used. For example, Kerberos Security Service Provider (Kerberos SSP) Authentication Package (SSP/AP) may be used. Various programming interfaces to the Kerberos SSP may be utilized, including, but not limited to, LsaCallAuthenticationPackage and KERB_CERTIFICATE_LOGON. A smart card equivalent client certificate, in conjunction with a custom credential provider and custom key storage provider (KSP), may be used to invoke the PKINIT Kerberos logon protocol previously discussed. The KSP may be exposed to the specific protocol elements of PKINIT that can be signed with the private key, such as the checksum of the AuthPack structure. Additionally, the Kerberos SSP may use OS APIs to invoke cryptographic operations, such as the Hash API used to compute the checksum which is an initial step in generating a signature. By intercepting the Hash API calls made by the Kerberos SSP the protocol elements upon which signatures are to be calculated can be seen. The Hash API calls can be intercepted by using a custom SSP which is loaded into the trusted LSASS process where the Kerberos SSP performs PKINIT.

As previously noted, the elements to be signed may comprise an AuthPack structure described in section 3.2.1 of RFC4556. Furthermore, the protocol element may have some well-formed structure, such as a structure that follows ASN.1 binary encoding rules. Additionally, the structure may include a timestamp which represents the current time, allowing the client device 705 to perform a basic validation check against the client device's own knowledge of the current time. To allow for time variances that may be likely in practice, the client device 705 may wish to allow a wider latitude of variance than, for example, the authentication server (e.g., a KDC) will. For example, the client device 705 may accept a time value that is within 24 hours of its own time value, rather than the 5 minutes which is what the KDC may allow.

In some embodiments, the KSP may reliably locate the KRB-REQ-BODY binary structure which may have been prepared in the Kerberos SSP prior to invoking the certificate sign operation which ultimately calls the KSP. If this structure can be located, such as from a stack walk back to the Kerberos SSP, then a full validation of AuthPack may be possible. Alternatively, by intercepting the OS Hash API calls made by the Kerberos SSP, to compute a checksum of KRB-REQ_BODY as part of the preparation of the AuthPack structure, the KRB-REQ-BODY structure may be directly visible. A copy of the structure can then be sent by the proxy device 710 to the client device 705 as part of the PK operation request. Similarly the AuthPack structure may be visible to the Hash API as part of the signature construction. As previously noted, a special communication channel between the client device 705 and the proxy device 710 may comprise a custom GSS-API mechanism. In the virtualization embodiment, the special communication channel may be inside a virtual channel in the display remoting protocol. For example, a SSPI Virtual Channel may be used. In some aspects, if a SSPI negotiation fails to complete authentication itself, other authentication methods supported by the display remoting protocol can be used instead.

In some embodiments, the aspects described herein may be applied to CITRIX XenAPP and/or XenDesktop. XenApp and XenDesktop may support smart card remoting using a smart card virtual channel that remotes a smart card reader interface (e.g., a PC/SC). The aspects described herein may replace PC/SC remoting for the purpose of Windows logon. The smart card may be accessed once the session has been established, for instance to support applications that use the smart card to sign documents. This may be achieved by appropriately configuring the smart card API hooks used by XA/XD, causing them not to apply in the Windows Logon processes (e.g., winlogon.exe, logonui.exe, etc.), but still apply normally to other processes.

From the client device 705's perspective, the certificate operations that are remoted may be associated with a particular form of PKINIT (e.g., 'sign-for-PKINIT-from-XenApp'), and the smart card context used for PKINIT may be immediately released upon conclusion so that application causes additional PIN prompts if required. Additionally or alternatively, the smart card context may have been used prior to the PKINIT request, for example by the client device 705 to perform SSL with client certificate authentication to the proxy device 710 or to another device or server. In this way, a single PIN prompt may be sufficient to enable authentication by the client device 705 to a broker server which identifies the proxy device 710 to be used for the resource access operations (from a plurality of devices that can perform this service). The selected proxy device 710 may then perform PKINIT without an additional PIN prompt and without having required explicit PIN caching by the client device 705. In the case of domain login to application or desktop virtualization servers, a significant performance improvement may be achieved over traditional methods of remote smart card authentication. Furthermore, this can be achieved without needing to implement the full reader and smart card interface for a virtual smart card.

Various modifications to the aspects describe above can be made. Each entity (client device 705, proxy device 710, authentication service 715, and/or resource 720) may be made aware of the activities of the other entities. For example, each entity may be provided with identifiers for one or more of the other entities. The identifiers may be provided during any of the message exchanges previously described with respect to FIGS. 9A-C. For example, the proxy device 710 may inject information identifying the client device 705 into the information packets that the proxy device 710 sends to the resource/authentication server. The proxy device 710 may also inject information identifying the resource/authentication server into the information packets the proxy device 710 sends to the client device 705. In a similar manner, the type of client device 705 (e.g., PC, tablet, smartphone, etc.) may be provided to the other entities. In some aspects, Kerberos Protocol Extensions (e.g., MS-KILE), as described in RFC 6113, which is hereby incorporated by reference in its entirety, may be leveraged to make the activities of entities available to other entities. By providing identification information to the resource 720, the resource 720 may determine who is accessing data and/or also restrict access to data.

For the case of Kerberos, it is possible in some implementations (e.g., a Windows Server 2012 implementation) to provide two principal identities during network service authentication. The proxy device 710 may use its own Kerberos identity (e.g., TGT) to 'armor' the TGS exchange, as described in the Microsoft Kerberos Protocol Extensions documentation [MS-KILE] and RFC 6113. This technique is referred to as FAST, also described in RFC 6113. A compound identity for the user/client device 705 and proxy device 710 may be created. In Windows Server 2012, this compound identity may be exposed to resources that operate on top of the Windows ACL framework, with the ability for ACLs to inspect the machine identity and other claims. While a Windows Server 2012 implementation has been described, one of ordinary skill in the art would recognize that any other implementations using different operating systems may be utilized.

The proxy device 710 may use generalized claims mechanisms to also supply information relating to the client device 705 itself, which could reflect its identity (if known from other means, such as device certificate authentication by SSL to the proxy device 710) or other relevant attributes of the device such as its type, OS, version, or security posture that may be learned during the authentication or resource access process from client device 705 to proxy device 710.

Another modification to the aspects describe above may comprise adjusting a user experience to notify the user of operations using the client certificate. Information that the proxy device 710 provides to the client device 705 may be displayed to the user. In another example, the display may indicate that the client device 705 is in the middle of a logon process, which may also utilize the client certificate. A PIN prompt may also be displayed, such as for smart cards using Class 1 readers. More detailed displays to the user that faithfully represents the operation to be conducted may be provided. For example, for signing documents with the client certificate, the document may be displayed to the user for review. A suitable summary indicator of a transaction to be performed may also be displayed. Detailed displays may be utilized in any of the smart card reader classes, such as Class 4. In some embodiments, the client device 705 may simulate a smart card reader (or support using such a reader if interacting with a physical smart card).

Unnecessary interactions with the user may be avoided. For example, the scope of remoted certificate operations may be properly grouped (e.g., bounded), so that multiple operations which are part of the same group (e.g., a group of operations using the same resource authentication protocol) may be recognized as being part of the same group, and a logical group may be created. In some aspects, one information display or prompt may be displayed to the user for operations within the same group. Approximately speaking, this logical grouping corresponds to obtaining and releasing a smart card context in the case of traditional physical smart cards.

Although the subject matter has been described in language specific to structural features and/or methodological acts, it is to be understood that the subject matter defined in the appended claims is not necessarily limited to the specific features or acts described above. Rather, the specific features and acts described above are described as example implementations of the following claims.

What is claimed is:

1. A method comprising:
receiving, at a proxy device and from a client device, a request for a resource;
sending, from the proxy device to a resource management device, a request for the resource;
initiating an authentication session between the proxy device and the resource management device to authenticate the proxy device with the resource management device;
generating, by the proxy device, a request for the client device to provide a signature, wherein the request for the client device to provide the signature comprises context information identifying a data structure of (1) authentication information previously exchanged between the proxy device and the resource management device during the authentication session or (2) authentication information to be sent by the proxy device to the resource management device during the authentication session;
receiving, at the proxy device and from the client device, the signature; and
sending, from the proxy device to the resource management device, the signature.

2. The method of claim 1, further comprising:
after initiating the authentication session, receiving, at the proxy device and from the client device, a list of security certificates available to the client device; and
selecting a security certificate for the authentication session,
wherein the request for the client device to provide the signature includes an identification of the selected security certificate.

3. The method of claim 1, further comprising:
after sending the signature to the resource management device, receiving, at the proxy device, a session key corresponding to the signature.

4. The method of claim 3, further comprising:
using, by the proxy device, the session key to obtain the requested resource from the resource management device.

5. The method of claim 4, further comprising:
sending, from the proxy device to the client device, the requested resource.

6. The method of claim 1, wherein the authentication session comprises SSL authentication, and wherein the context information identifying the data structure comprises SSL authentication messages previously exchanged between the proxy device and the resource management device during the authentication session.

7. The method of claim 1, wherein the authentication session comprises Kerberos authentication, and wherein the context information identifying the data structure comprises information identifying a Kerberos data structure.

8. The method of claim 7, wherein the Kerberos data structure comprises Abstract Syntax Notation 1.

9. The method of claim 1, wherein the authentication session comprises Kerberos authentication, and wherein the context information identifying the data structure comprises at least one of a Kerberos domain used for the Kerberos authentication, a Kerberos principal name associated with the client device, an identifier of a key distribution center used for the authentication session, a validity period of a requested ticket, and Kerberos flags that have been set during the authentication session.

10. The method of claim 1, wherein the context information identifies a timestamp associated with the authentication session.

11. The method of claim 1, wherein the context information identifies a protocol type of the authentication session.

12. The method of claim 1, wherein the signature is provided from a smart card at the client device.

13. A proxy device comprising:
a processor; and
memory storing computer-executable instructions that, when executed by the processor, cause the proxy device to:
receive, from a client device, a request for a resource;
send, to a resource management device, a request for the resource;
initiate an authentication session between the proxy device and the resource management device to authenticate the proxy device with the resource management device;
generate a request for the client device to provide a signature, wherein the request for the client device to provide the signature comprises context information identifying a data structure of (1) authentication information previously exchanged between the proxy device and the resource management device during the authentication session or (2) authentication information to be sent by the proxy device to the resource management device during the authentication session;
receive, from the client device, the signature; and
send, to the resource management device, the signature.

14. The proxy device of claim 13, wherein the memory stores computer-executable instructions that, when executed by the processor, cause the proxy device to:
after sending the signature to the resource management device, receive a session key corresponding to the signature.

15. The proxy device of claim 14, wherein the memory stores computer-executable instructions that, when executed by the processor, cause the proxy device to:
use the session key to obtain the requested resource from the resource management device.

16. The proxy device of claim 13, wherein the authentication session comprises SSL authentication, and wherein the context information identifying the data structure comprises SSL authentication messages previously exchanged between the proxy device and the resource management device during the authentication session.

17. The proxy device of claim 13, wherein the authentication session comprises Kerberos authentication, and wherein the context information identifying the data structure comprises information identifying a Kerberos data structure.

18. A method comprising:
sending, from a client device to a proxy device, a request for a resource;
receiving, at the client device from the proxy device, a request for the client device to provide a signature, wherein the request for the client device to provide the signature comprises context information identifying a data structure of (1) authentication information previously exchanged between the proxy device and a resource management device associated with the requested resource during an authentication session between the proxy device and the resource management device to authenticate the proxy device with the resource management device or (2) authentication information to be sent by the proxy device to the resource management device during the authentication session;
verifying, by the client device, the data structure; and
in response to verifying the data structure, sending, from the client device to the proxy device, a signature corresponding to a security certificate.

19. The method of claim 18, wherein the security certificate is stored on a smart card connected to the client device.

20. The method of claim 18, further comprising:
in response to a request, sending, from the client device to the proxy device, a list comprising one or more security certificates available to the client device,
wherein the received request for the client device to provide the signature includes an identification of a security certificate selected from the list comprising one or more security certificates.

* * * * *